(12) United States Patent
Kitagawa

(10) Patent No.: US 11,347,255 B2
(45) Date of Patent: May 31, 2022

(54) REACTION FORCE CONTROL SYSTEM FOR PEDAL

(71) Applicant: TOYOTA JIDOSHA KABUSHIKI KAISHA, Toyota (JP)

(72) Inventor: Hiroyasu Kitagawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/087,804

(22) Filed: Nov. 3, 2020

(65) Prior Publication Data

US 2021/0141411 A1 May 13, 2021

(30) Foreign Application Priority Data

Nov. 11, 2019 (JP) .............................. JP2019-203835

(51) Int. Cl.
*G05G 5/03* (2008.04)
*B60K 26/02* (2006.01)
*B60T 8/40* (2006.01)

(52) U.S. Cl.
CPC .............. *G05G 5/03* (2013.01); *B60K 26/021* (2013.01); *B60K 2026/023* (2013.01); *B60T 8/4081* (2013.01)

(58) Field of Classification Search
CPC ............................................... B60K 2026/023
See application file for complete search history.

(56) References Cited

U.S. PATENT DOCUMENTS

| | | | |
|---|---|---|---|
| 9,815,367 B2 * | 11/2017 | Maruyama | B60W 50/16 |
| 2012/0109481 A1 * | 5/2012 | Mitsuyasu | B60T 7/06 701/70 |
| 2012/0216652 A1 * | 8/2012 | Yamazaki | G05G 1/30 74/513 |

FOREIGN PATENT DOCUMENTS

| | | |
|---|---|---|
| JP | 2006-159996 A | 6/2006 |
| JP | 2009-292285 A | 12/2009 |
| JP | 2011-5929 A | 1/2011 |
| JP | 2014-148285 A | 8/2014 |

* cited by examiner

*Primary Examiner* — Vicky A Johnson
(74) *Attorney, Agent, or Firm* — Sughrue Mion, PLLC

(57) ABSTRACT

A reaction force control system configured to control a reaction force applied to a pedal without reducing an operational feeling. A controller reduces a reaction force applied to the pedal mildly from a second reaction force to a first reaction force at a rate D upon satisfaction of a predetermined condition. The rate D is determined based on a depression of the pedal, a pedal force applied to the pedal, an elapsed time, or a predetermined function.

12 Claims, 13 Drawing Sheets

REACTION FORCE CONTROL SYSTEM FOR PEDAL

CROSS REFERENCE TO RELATED APPLICATIONS

The present disclosure claims the benefit of Japanese Patent Application No. 2019-203835 filed on Nov. 11, 2019 with the Japanese Patent Office, the disclosure of which are incorporated herein by reference in its entirety.

BACKGROUND

Field of the Disclosure

Embodiments of the present disclosure relate to the art of a control system for controlling a reaction force against a pedal force applied to a pedal operated to accelerate and decelerate a vehicle, and especially to a control system for increasing a reaction force against a pedal force to maintain a pedal at a desired position.

Discussion of the Related Art

JP-A-2006-159996 describes a travel control device for a vehicle adapted to use an accelerator pedal as a footrest. According to the teachings of JP-A-2006-159996, a reaction force of the accelerator pedal is increased at a predetermined depression angle to prevent further depression of the accelerator pedal even if a driver puts his/her foot on the accelerator pedal. When the accelerator maintained at the predetermined depression angle is further depressed by the driver, the increasing control of the reaction force of the accelerator pedal is cancelled and the reaction force is controlled in a normal manner.

JP-A-2014-148285 describes a reaction force control device adapted to improve operability of an accelerator pedal during turning. To this end, the reaction force control device taught by JP-A-2014-148285 detects a turning state amount, and increases a reaction force of the accelerator against a pedal force with an increase in the turning state amount. According to the teachings of JP-A-2014-148285, a hysteresis is set to reduce the reaction force of the accelerator pedal with respect to a reduction in the turning state amount. When a depression or a depressing speed of the accelerator pedal exceeds a predetermined value, the reaction force of the accelerator pedal is reduced immediately in accordance with the turning state amount.

JP-A-2009-292285 describes a pedal reaction force control device adapted to increase a reaction force of an accelerator pedal to use an accelerator pedal as a footrest during autonomous mode in which a vehicle is operated autonomously or a follow-up mode in which the vehicle follows a preceding vehicle. According to the teachings of JP-A-2009-292285, the reaction force of the accelerator pedal in the autonomous mode is reduced less than that in the follow-up mode.

As described, according to the teachings of JP-A-2006-159996, when the accelerator maintained at the predetermined depression angle is depressed further than a pedal stroke angle area, the increasing control of the reaction force of the accelerator pedal is cancelled and the reaction force is controlled in a normal manner. As also described, according to the teachings of JP-A-2014-148285, the increased reaction force of the accelerator pedal is reduced when a depression or a depressing speed of the accelerator pedal exceeds the predetermined value. In turn, according to the teachings of JP-A-2009-292285, the reaction force of the accelerator pedal increased to use the accelerator pedal as a footrest is reduced upon cancellation of the autonomous mode or the follow-up mode. Thus, according to the teachings of the above-explained prior art documents, the increased reaction force of the accelerator pedal will be reduced to an initial value upon satisfaction of some kind of condition. Such reduction in the reaction force causes a negative effect on an operational feeling of the pedal, however, the above-explained prior art documents do not focus on such negative effect resulting from reduction in the reaction force of the pedal.

SUMMARY

Aspects of the present disclosure have been conceived noting the foregoing technical problems, and it is therefore an object of the present disclosure to provide a reaction force control system configured to control a reaction force applied to a pedal without reducing an operational feeling, and without provide an uncomfortable feeling.

The reaction force control system for a pedal, comprises: a pedal that controls a driving condition of a vehicle; and a reaction force generator that generates a reaction force against a pedal force applied to the pedal, and that changes the reaction force. The reaction force control system is configured to select the reaction force applied to the pedal from at least a first reaction force that is selected during normal propulsion of the vehicle, and a second reaction force that is greater than the first reaction force. In order to achieve the above-explained objective, according to the exemplary embodiment of the present disclosure, the reaction force control system is provided with a controller that controls the reaction force applied to the pedal. Specifically, the controller is configured to: determine a satisfaction of a condition to reduce the reaction force applied to the pedal from the second reaction force to the first reaction force in a case that the second reaction force is selected; and execute a gradual reduction control to reduce the reaction force applied to the pedal gradually from the second reaction force to the first reaction force at a rate slower than a rate to reduce the reaction force applied to the pedal immediately from the second reaction force to the first reaction force.

In a non-limiting embodiment, the condition to reduce the reaction force applied to the pedal from the second reaction force to the first reaction force may include: a fact that a depression of the pedal is increased or decreased from a position of the pedal at a point when the reaction force applied to the pedal was increased to the second reaction force; and a fact that the pedal force applied to the pedal is increased or decreased from a pedal force applied to the pedal at the point when the reaction force applied to the pedal was increased to the second reaction force.

In a non-limiting embodiment, the gradual reduction control may include a control to reduce the reaction force applied to the pedal gradually from the second reaction force to the first reaction force at a rate slower than a rate to reduce the reaction force immediately from the second reaction force to the first reaction force in response to a transmission of the command signal to reduce the reaction force.

In a non-limiting embodiment, the gradual reduction control may include a control to reduce the reaction force applied to the pedal gradually from the second reaction force to the first reaction force in accordance with a change in any one of the depression of the pedal, the pedal force applied to the pedal, an elapsed time from a point at which the condition to reduce the reaction force from the second reaction force to the first reaction force has been satisfied, and a non-linear function determined employing any one of the depression of the pedal, the pedal force applied to the pedal, and the elapsed time as a parameter.

In a non-limiting embodiment, the controller may be further configured to set a range of the depression of the pedal or the pedal force applied to the pedal in which the second reaction force is maintained without executing the gradual reduction control, even if the depression of the pedal or the pedal force applied to the pedal is changed. The condition to reduce the reaction force applied to the pedal from the second reaction force to the first reaction force may include a fact that the depression of the pedal or the pedal force applied to the pedal is changed to exceed the range of the depression of the pedal or the pedal force applied to the pedal in which the second reaction force is maintained.

In a non-limiting embodiment, the range of the depression of the pedal or the pedal force applied to the pedal in which the second reaction force is maintained may be set only in a range from the position of the pedal or the pedal force applied to the pedal at which the second reaction force was selected, in a direction to reduce the depression of the pedal or the pedal force applied to the pedal.

In a non-limiting embodiment, the elapsed time from the point at which the condition to reduce the reaction force from the second reaction force to the first reaction force has been satisfied may include an elapsed time counted from a point at which a change in the depression of the pedal or the pedal force applied to the pedal exceeds the range of the depression of the pedal or the pedal force applied to the pedal in which the second reaction force is maintained.

In a non-limiting embodiment, the controller may be further configured to: detect the depression of the pedal or the pedal force applied to the pedal during execution of the gradual reduction control; determine that the depression of the pedal or the pedal force applied to the pedal is not changed for a predetermined period of time, or that the depression of the pedal or the pedal force applied to the pedal being increased is reduced; and increase the reaction force applied to the pedal to the second reaction force, if the depression of the pedal or the pedal force applied to the pedal is not changed for the predetermined period of time, or the depression of the pedal or the pedal force applied to the pedal being increased is reduced during execution of the gradual reduction control.

In a non-limiting embodiment, the controller may be further configured to: increase the reaction force applied to the pedal to the second reaction force if a predetermined preconditional control has been commenced and a starting condition to increase the reaction force applied to the pedal to the second reaction force is satisfied; and execute the gradual reduction control if the preconditional control has been cancelled and the depression of the pedal or the pedal force applied to the pedal is reduced in a situation that the second reaction force is applied to the pedal.

In a non-limiting embodiment, the gradual reduction control may include a control to reduce the reaction force applied to the pedal gradually from the second reaction force to the first reaction force in accordance with a change in the depression of the pedal or the pedal force applied to the pedal.

In a non-limiting embodiment, the controller may be further configured to: increase the reaction force applied to the pedal to the second reaction force if a predetermined preconditional control has been commenced and a starting condition to increase the reaction force applied to the pedal to the second reaction force is satisfied; execute the gradual reduction control if the preconditional control has been cancelled and the depression of the pedal or the pedal force applied to the pedal is maintained to a constant value in a situation that the second reaction force is applied to the pedal; and the gradual reduction control includes a control to reduce the reaction force applied to the pedal gradually from the second reaction force to the first reaction force in accordance with an elapsed time from a point at which the preconditional control has been cancelled.

In a non-limiting embodiment, the controller may be further configured to: detect the depression of the pedal or the pedal force applied to the pedal during execution of the gradual reduction control; determine that the depression of the pedal or the pedal force applied to the pedal is not changed for a predetermined period of time; and reduce the reaction force applied to the pedal from the second reaction force to the first reaction force in accordance with an elapsed time from a point at which the depression of the pedal or the pedal force applied to the pedal has been maintained to a constant value, if the depression of the pedal or the pedal force applied to the pedal is not changed for the predetermined period of time.

Thus, according to the exemplary embodiment of the present disclosure, the reaction force applied to the pedal is selected from the first reaction force that is selected during normal propulsion of the vehicle, and the second reaction force that is greater than the first reaction force. That is, when the reaction force applied to the pedal is increased to the second reaction force, the pedal will not be further depressed to serve as a footrest. In addition, the vehicle will not be accelerated or decelerated unintentionally even if a load applied to the pedal is changed due to e.g., vibrations of a vehicle body. In this situation, the reaction force applied to the pedal is reduced from the second reaction force to the first reaction force upon satisfaction of the predetermined condition. Specifically, the gradual reduction control is executed to reduce the reaction force applied to the pedal gradually from the second reaction force to the first reaction force at the rate slower than the rate to reduce the reaction force applied to the pedal immediately from the second reaction force to the first reaction force. In this situation, since the reaction force is applied to the pedal against the pedal force applied to the pedal by a foot of the driver, the reaction force acting against the pedal force is reduced gradually. According to the exemplary embodiment of the present disclosure, therefore, the driver will not notice a change in the reaction force applied to the pedal and will not be urged to operate the pedal in a different manner. For these reasons, the driver will not experience a feeling of strangeness even if the reaction force is reduced from the second reaction force to the first reaction force.

As described, according to the exemplary embodiment of the present disclosure, the second reaction force may be maintained even if the depression of the pedal or the pedal force applied to the pedal is changed within the above-mentioned range. According to the exemplary embodiment of the present disclosure, therefore, it is possible to discriminate between an intentional change in the depression of the pedal or the pedal force applied to the pedal and an unintentional change in the depression of the pedal or the pedal force applied to the pedal. For this reason, a driving condition of the vehicle may be controlled in line with the intention of the driver operating the pedal. That is, an operational feeling of the pedal can be improved.

Specifically, as also described, the range of the depression of the pedal or the pedal force applied to the pedal in which the second reaction force is maintained may be set only in the range from the position of the pedal or the pedal force applied to the pedal at which the second reaction force was selected, in the direction to reduce the depression of the pedal or the pedal force applied to the pedal. Therefore, the pedal can be prevented from being depressed unintentionally by increasing the second reaction force applied to the pedal. For this reason, the range of the depression of the pedal or the pedal force applied to the pedal in which the second reaction force is maintained may be set easily, and the reaction force applied to the pedal may be controlled easily.

In addition, according to the exemplary embodiment of the present disclosure, if an operating direction of the pedal is reversed or the pedal force applied to the pedal is changed during execution of the gradual reduction control, the reaction force applied to the pedal is increased to the second reaction force again in line with the intention of the driver expressed as such change in the operation of the pedal. According to the exemplary embodiment of the present disclosure, therefore, the reaction force applied to the pedal can be controlled in line with the driver's intention so that the operational feeling of the pedal is improved.

Further, according to the exemplary embodiment of the present disclosure, the reaction force applied to the pedal may be increased to the second reaction force when the preconditional control is commenced to operate the vehicle in an autonomous mode or an auto-cruise mode while controlling a drive force and a brake force of the vehicle autonomously. In this case, the reaction force applied to the pedal is reduced from the second reaction force to the first reaction force when the preconditional control is cancelled. In this situation, the gradual reduction control is executed to reduce the reaction force gradually to the second reaction force in accordance with the elapsed time, or in accordance with a change in the depression of the pedal or the pedal force applied to the pedal if the pedal is being returned. According to the exemplary embodiment of the present disclosure, therefore, the reaction force applied to the pedal may be reduced mildly with a reduction in the depression of the pedal or the pedal force applied to the pedal. For this reason, the operational feeling of the pedal and the easiness to operate the pedal can be improved, while reducing a feeling of strangeness to operate the pedal.

Furthermore, according to the exemplary embodiment of the present disclosure, the reaction force applied to the pedal may be reduced with time in a case that the depression of the pedal or the pedal force applied to the pedal is maintained to a constant value in spite of cancelling the preconditional control. According to the exemplary embodiment of the present disclosure, therefore, the reaction force applied to the pedal may be reduced mildly. For this reason, the operational feeling of the pedal and the easiness to operate the pedal can be improved, while reducing a feeling of strangeness to operate the pedal.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
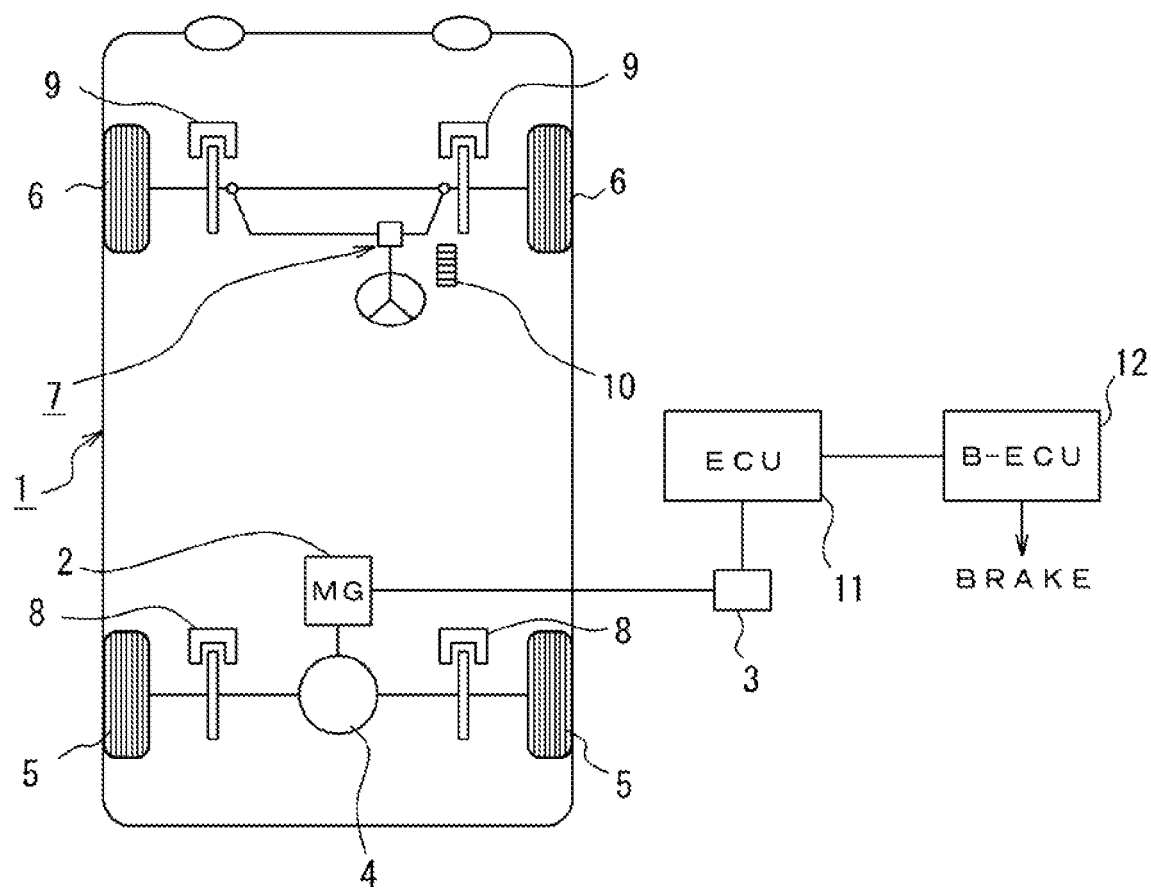
FIG. 1 is a schematic illustration showing one example of a structure of the vehicle to which the reaction force control system according to the exemplary embodiment is applied.

Turning now to FIG. 1, there is shown one example of a structure of a vehicle to which the reaction force control system according to the exemplary embodiment of the present disclosure is applied. The reaction force control system may be applied to a vehicle comprising an accelerator pedal and a brake pedal for accelerating and decelerating the vehicle. The vehicle 1 shown in FIG. 1 is an electric vehicle in which a motor (referred to as "MG" in FIG. 1) 2 is adopted as a prime mover, and for example, a permanent magnet synchronous motor may be adopted as the motor 2. The motor 2 generates a drive torque when electricity is supplied thereto, and generates an electric power when rotated passively by e.g., an inertia force of the vehicle 1. A negative torque resulting from such power generation of the motor 2 serves as a brake force (or torque) to decelerate the vehicle 1.

The motor 2 is connected to a power source 3 including an electric storage device and an inverter so that an electric power is supplied to the motor 2 from the electric storage device and the electric power generated by the motor 2 is accumulated in the electric storage device, and that a voltage and a frequency of the electric power are controlled by the inverter.

An output shaft (i.e., a rotor shaft) of the motor 2 is connected to a differential gear unit 4 as a final reduction unit, and a pair of rear wheels 5 is connected to the differential gear unit 4. A steering device 7 is connected to a pair of front wheels 6 so that the front wheels 6 are turned by operating the steering device 7.

Each of the front wheels 6 is individually provided with a brake 9, and each of the rear wheels 5 is individually provided with a brake 8. For example, a conventional friction brake such as a disc brake, a drum brake, a powder brake or the like may be adopted as the brakes 8 and 9. That is, each of the brakes 8 and 9 individually generates a frictional brake force by a hydraulic pressure or an electromagnetic force, in a direction to stop a rotation of the wheel 5 or 6.

A pedal 10 is arranged in the vehicle 1 to accelerate and decelerate the vehicle 1. According to the example shown in FIG. 1, the vehicle 1 is not only accelerated but also decelerated by manipulating the pedal 10. That is, a conventional one-pedal system is employed in the vehicle 1 shown in FIG. 1.

In order to control the vehicle 1, the vehicle 1 is provided with an electronic control unit (to be abbreviated as "ECU" hereinafter) 11 as a controller. The ECU 11 comprises a microcomputer as its main constituent configured to preform calculation based on incident data, and a program as well as data installed in advance. A calculation result is transmitted from the ECU 11 in the form of command signal so as to control a drive torque and a brake torque thereby changing acceleration and deceleration of the vehicle 1.

In order to control the brakes 8 and 9, another electronic control unit (referred to as "B-ECU" hereinafter) 12 is connected to the ECU 11 in such a manner as to exchange data therebetween. The B-ECU 12 also comprises a microcomputer as its main constituent configured to preform calculation based on incident data, and a program as well as data installed in advance. A calculation result is transmitted from the B-ECU 12 to the brakes 8 and 9 in the form of command signal so as to control e.g., hydraulic pressures to actuate the brakes 8 and 9.

In addition, the drive force and the brake force applied to the vehicle 1 may also be controlled autonomously without operating the pedal 10 manually. That is, an operating mode of the vehicle 1 includes an autonomous mode and an auto-cruise control mode in which the drive force to propel the vehicle 1, the brake force to decelerate the vehicle 1, a steering torque to turn the vehicle 1 etc. are controlled autonomously by the ECU 11 taking account of other vehicles around the vehicle 1 and the situation around the vehicle 1. In order to operate the vehicle 1 autonomously, for example, the ECU 11 collects information about a depression of the pedal 10 (i.e., a position of the pedal 10, an opening degree of a throttle valve, or a stroke of the pedal 10), a pedal force applied to the pedal 10, transmission of command signals to execute and cancel the auto-cruise control, a target speed of the vehicle 1, a distance from the preceding vehicle. In the autonomous mode or the auto-cruise control mode, for example, the ECU 11 transmits command signals to operate the motor 2 as a prime mover, to operate the motor as a generator, to activate the brakes 8 and 9 and so on.

In order to ensure an operational feeling of the pedal 10 and to push back the pedal 10 toward an initial position, a reaction force is applied to the pedal 10. A position of the pedal 10 may be fixed by increasing the reaction force applied to the pedal 10, that is, a depression of the pedal 10 may be restricted by increasing the reaction force applied to the pedal 10. Therefore, the pedal 10 may be used as a footrest by increasing the reaction force applied to the pedal 10. According to the exemplary embodiment of the present disclosure, the reaction force to establish the operational feeling of the pedal 10 and to push back the pedal 10 during normal propulsion will be referred to as the "first reaction force", and the reaction force increased by the after-mentioned increasing control will be referred to as the "second reaction force". Accordingly, a difference calculated by subtracting the first reaction force from the second reaction force is an "additional reaction force" of the exemplary embodiment of the present disclosure.

Figure 2:
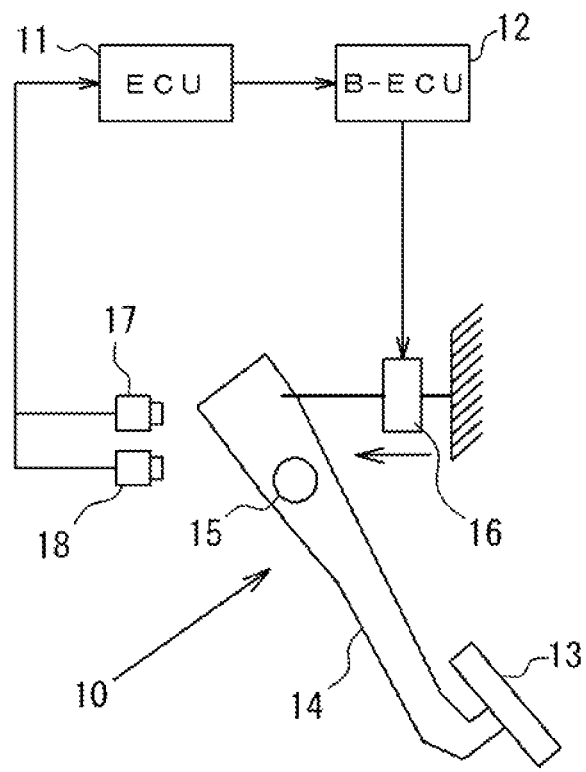
FIG. 2 is a schematic illustration showing one example of a structure of a pedal of the vehicle.

One example of a structure of the pedal 10 is shown in FIG. 2. As illustrated in FIG. 2, a lever 14 is attached to a vehicle body (not shown) in a pivotal manner about a fulcrum (or shaft) 15, and a pedal pad 13 is attached to a lower end of the lever 14 to be depressed by a foot of a driver. The reaction force is applied to the pedal 10 from a reaction force generator 16 to counteract the pedal force applied to the pedal 10. Specifically, the reaction force generator 16 has a known structure, and generates the reaction force electromagnetically, elastically, or hydraulically based on the command signal transmitted from the B-ECU 12. A depression (or position) of the pedal 10 is detected by a stroke sensor 17 and transmitted to the ECU 11, and a pedal force applied to the pedal 10 is detected by a pedal force sensor 18 and transmitted to the ECU 11.

Figure 3:
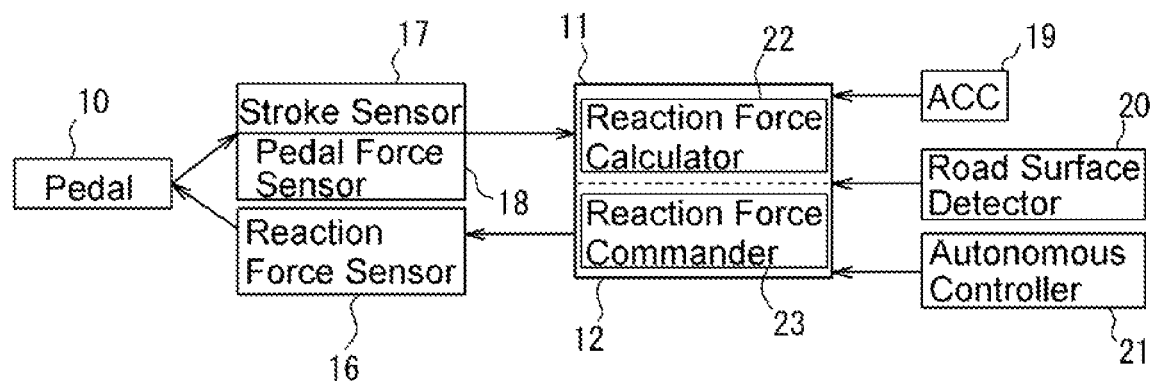
FIG. 3 is a block diagram showing a system to control a reaction force applied to the pedal.

A system to control the reaction force applied to the pedal 10 is shown in FIG. 3. The reaction force applied to the pedal 10 is controlled by the ECU 11 and the B-ECU 12, and as described, the reaction force applied to the pedal 10 is selected from the first reaction force for the normal propulsion and the second reaction force increased from the first reaction force. In order to select the reaction force from the first reaction force and the second reaction force, signals are transmitted to the ECU 11 and the B-ECU 12 from an auto-cruise system (referred to as "ACC" in FIG. 3) 19 that maintains a speed of the vehicle 1, a road surface detector 20 that detects a condition of a road surface such as a friction coefficient μ and unevenness of the road surface, and an autonomous controller (referred to as "autonomous ECU" in FIG. 3) 21 that operates the vehicle 1 autonomously.

The ECU 11 or the B-ECU 12 comprises a reaction force calculator 22 that calculates the reaction force based on the above-mentioned incident data, and a reaction force commander 23 that transmits a calculation result of the reaction force in the form of command signal. Accordingly, at least any one of the ECU 11 and the B-ECU 12 serve(s) as the controller of the exemplary embodiment of the present disclosure.

Figure 4:
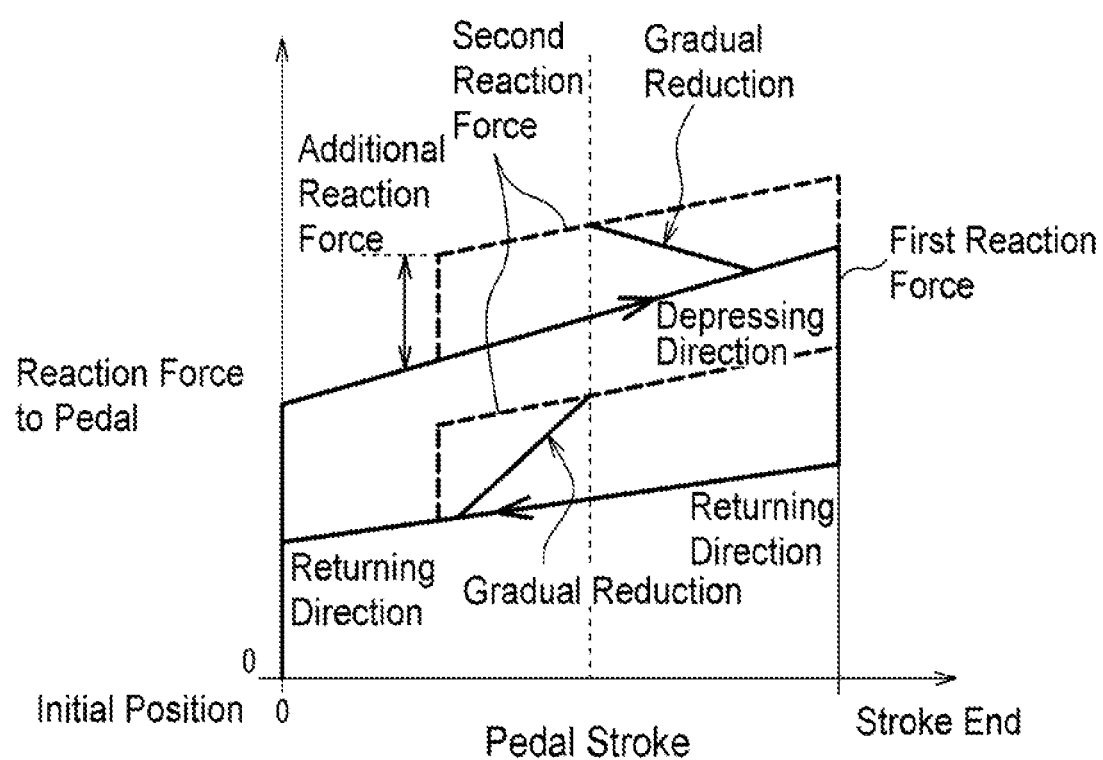
FIG. 4 is a graph indicating a relation between a stroke (or depression) of the pedal and the reaction force applied to the pedal.

The first reaction force and the second reaction force are indicated in FIG. 4. In FIG. 4, the first reaction force is indicated by the thick solid line, and the first reaction force is increased in accordance with a depression (i.e., a stroke) of the pedal 10. As described, the first reaction force is generated by electrically actuating the reaction force generator 16. Otherwise, an elastic member such as a spring may also be arranged in the reaction force generator 16 to establish the first reaction force. In FIG. 4, the second reaction force is indicated by the dashed line, and the second reaction force is also generated by electrically actuating the reaction force generator 16. Instead, the second reaction force may also be generated by electrically actuating another actuator that is actuated electrically instead of the elastic member. In this case, specifically, the additional reaction force is generated by another actuator to increase the reaction force to the second reaction force, when the pedal 10 is depressed further than a predetermined range.

First Control Example

Figure 5:
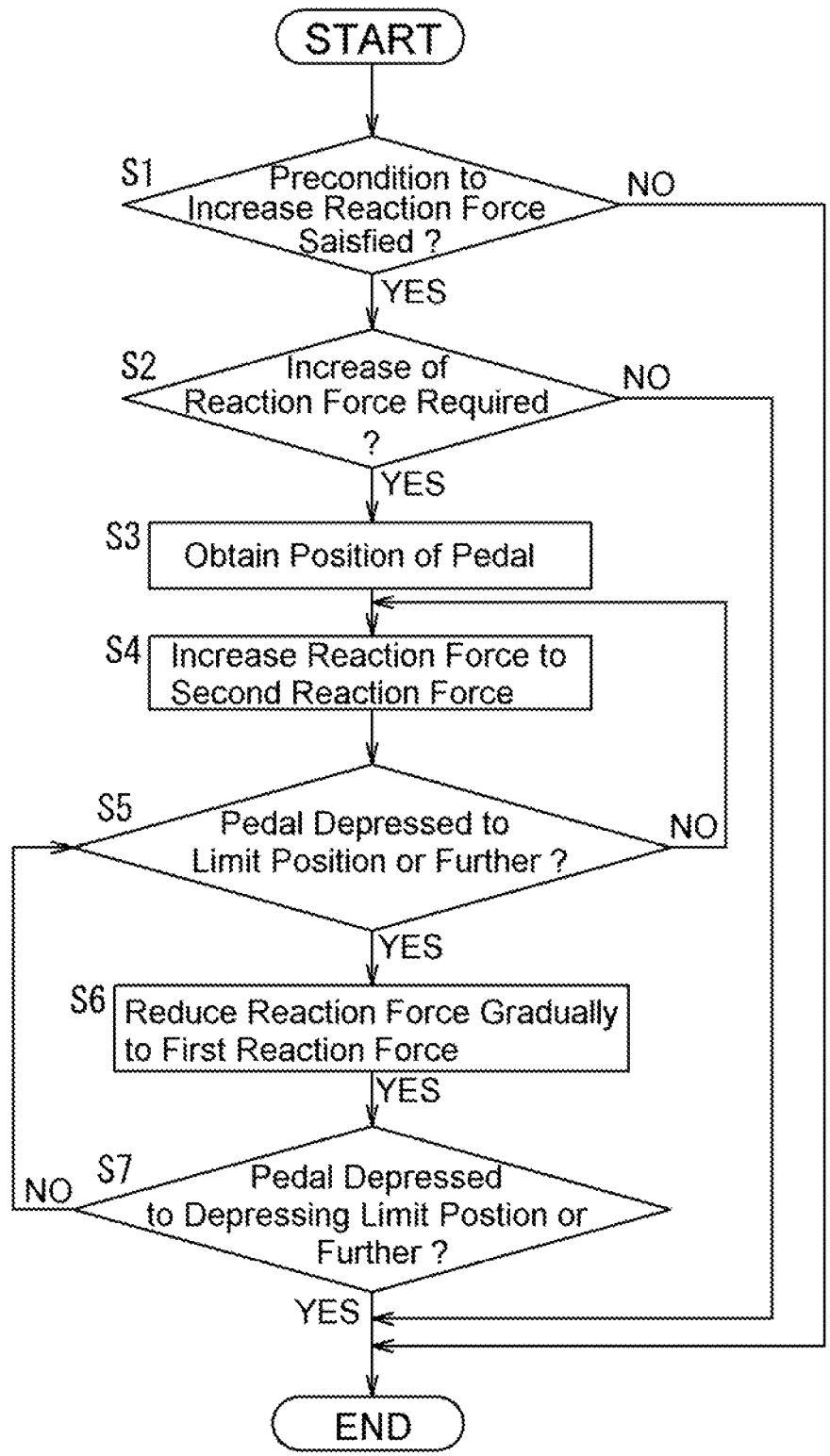
FIG. 5 is a flowchart showing a routine executed by the reaction force control system according to the first control example.

Here will be explained the first control example to select the reaction force from the first reaction force and the second reaction force. As described, the second reaction force is increased from the first reaction force in the amount of the above-mentioned additional reaction force, and the reaction force applied to the pedal 10 is increased from the first reaction force to the second reaction force according to need. By contrast, the reaction force applied to the pedal 10 is reduced from the second reaction force to the first reaction force upon satisfaction of a condition to cancel such increase in the reaction force. Turning to FIG. 5, there is shown a routine to increase the reaction force applied to the pedal 10 from the first reaction force to the second reaction force, and then reduce the reaction force from the second reaction force to the first reaction force when the pedal 10 is depressed intentionally by the driver. The routine shown in FIG. 5 is executed when the vehicle 1 is brought into a ready-on state or during propulsion of the vehicle 1.

At step S1, it is determined whether a precondition to increase the reaction force applied to the pedal 10 is satisfied. The precondition is one of the conditions to increase the reaction force applied to the pedal 10 to the second reaction force, and for example, the precondition includes a fact that an execution flag of the auto-cruise control is turned on, a fact that the vehicle 1 is propelled in the autonomous mode, and a fact that a road surface is significantly bumpy. A satisfaction of the precondition may be determined based on the incident data to the ECU 11.

If the precondition is not satisfied so that the answer of step S1 is NO, the routine returns without carrying out any specific control. By contrast, if the precondition is satisfied so that the answer of step S1 is YES, the routine progresses to step S2 to determine whether it is required to add the additional reaction force to the first reaction force. That is, a satisfaction of another one of the conditions to increase the reaction force applied to the pedal 10 from the first reaction force to the second reaction force is determined at step S2. If it is not required to increase the reaction force applied to the pedal 10 from the first reaction force to the second reaction force so that the answer of step S2 is NO, the routine returns without carrying out any specific control.

For example, another one of the conditions to increase the reaction force to the second reaction force is satisfied when a switch (not shown) to increase the reaction force is turned on manually, or when the vehicle 1 is allowed to propel on a lightly trafficked highway at a speed higher than a predetermined speed. That is, there are a case that it is preferable to increase the reaction force applied to the pedal 10, and a case that it is not preferable to increase the reaction force applied to the pedal 10, depending on a preference of the driver, travelling conditions, road conditions and so on. Therefore, the routine shown in FIG. 5 is adapted to be executed in the vehicle 1 in which the reaction force applied to the pedal 10 can be increased selectively. For example, if the vehicle 1 travels in a condition to be accelerated and decelerated frequently, such request to increase the reaction force to the second reaction force may be denied. In this case, the travelling conditions or the like may be considered as the precondition to increase the reaction force.

If it is required to increase the reaction force applied to the pedal 10 from the first reaction force to the second reaction force so that the answer of step S2 is YES, the routine progresses to step S3 to detect (or obtain) a depression (or position) of the pedal 10. Then, the routine further progresses to step S4 to increase the reaction force applied to the pedal 10 from the first reaction force to the second reaction force in the amount of the additional reaction force. Magnitudes of the second reaction force and the additional reaction force added to the first reaction force may be set to a predetermined value respectively. Instead, magnitudes of the second reaction force and the additional reaction force may also be changed depending on a purpose to increase the reaction force. For example, in a case of using the pedal 10 as a footrest, magnitudes of the second reaction force and the additional reaction force may be set based on an average load applied to the pedal 10 from the foot of the driver that is put on the pedal 10 without intension of depressing the pedal 10. Otherwise, in a case of travelling on a bumpy road, the second reaction force or the additional reaction force may be further increased in order not to change a depression of the pedal 10 by a repetition of change in the load applied from the foot of the driver due to vibration. In addition, the second reaction force or the additional reaction force may also be further increased in order to prevent a sudden starting of the vehicle 1 due to unexpected increase in acceleration.

Thereafter, it is determined at step S5 whether a position of the pedal 10 is at a furthest limit position to maintain the reaction force applied to the pedal 10 to the second reaction force or further than the furthest limit position. According to the first control example, a range of a position (i.e., stroke or depression) of the pedal 10 in which the second reaction force is maintained (i.e., a hysteresis) is set, and the furthest limit position is a furthest (or deepest) position of the pedal 10 in the range in which the second reaction force is maintained. The range in which the second reaction force is maintained and the furthest limit position of the pedal 10 in the range to maintain the second reaction force may be set based on a result of experiment or simulation. For example, in the case of propelling the vehicle 1 in the auto-cruise mode, the auto-cruise mode is cancelled by depressing the pedal 10. Therefore, the furthest limit position of the pedal 10 in the range to maintain the second reaction force may be set to a position around a position at which the auto-cruise mode is cancelled. Instead, the furthest limit position of the pedal 10 to maintain the second reaction force may also be set to a furthest position in a range of a movement of the right foot of the driver while the driver propels the vehicle at a substantially constant speed. In this case, such range of a movement of the right foot of the driver may be found based on a result of experiment or simulation. That is, the furthest limit position of the pedal 10 to maintain the second reaction force is set to the position at which a fact that the driver depresses the pedal 10 with the intention to accelerate the vehicle 1 can be determined.

If the pedal 10 is not depressed to the furthest limit position to maintain the reaction force applied to the pedal 10 so that the answer of step S5 is NO, this means that the position of the pedal 10 is maintained within the range to maintain the second reaction force. In this case, therefore, the routine returns to step S4 to maintain the second reaction force. By contrast, if the pedal 10 is depressed to the furthest limit position or further than the furthest limit position so that the answer of step S5 is YES, this means that the condition to maintain the reaction force applied to the pedal 10 to the second reaction force is no longer satisfied. That is, a condition to reduce the reaction force applied to the pedal 10 from the second reaction force to the first reaction force is satisfied when the pedal 10 is depressed to the furthest limit position or further than the furthest limit position. In this case, therefore, the routine progresses to step S6 to reduce the reaction force applied to pedal 10 gradually from the second reaction force to the first reaction force. Specifically, the reaction force applied to the pedal 10 is reduced gradually from the second reaction force to the first reaction force at a rate slower (or milder) than e.g., a fastest rate to reduce the reaction force immediately from the second reaction force to the first reaction force in response to a transmission of the command signal to reduce the reaction force. For example, the fastest rate is calculated taking account of a delay in transmission of the command signal, and a delay due to mechanical factor such as an inertial delay and a frictional delay. In short, the reaction force is reduced gradually from the second reaction force to the first reaction force at a rate slower than the rate to reduce the reaction force immediately from the second reaction force to the first reaction force.

For example, a position of the pedal 10, a pedal force applied to the pedal 10, an elapsed time from a point at which a condition to reduce the reaction force from the second reaction force to the first reaction force has been satisfied and so on may be employed as a parameter to determine a rate to reduce the reaction force gradually from the second reaction force to the first reaction force. In order to determine the rate to reduce the reaction force gradually, a target value of the reaction force applied to the pedal 10 is determined as a linear function or a non-linear function such as a quadratic function in accordance with a change in one of the above-mentioned parameters, and the reaction force is reduced gradually with time to achieve the target value.

Thereafter, it is determined at step S7 whether the pedal 10 is depressed to a depressing limit position at which the gradual reduction in the reaction force applied to the pedal 10 is terminated, or further than the depressing limit position. That is, the depressing limit position is a furthest (or deepest) position in a range of position of the pedal 10 to reduce the reaction force applied to the pedal 10 gradually from the first reaction force to the second reaction force. In other words, an upper limit value of a change amount in a position of the pedal 10 to reduce the reaction force gradually from the first reaction force to the second reaction force is defined by the depressing limit position. Specifically, the depressing limit position is set to a position at which the driver will not feel any uncomfortable feeling during a period of time to reduce the reaction force gradually from the second reaction force to the first reaction force. If the pedal 10 is not depressed to the depressing limit position so that the answer of step S7 is NO, the routine returns to step S5 to continue the gradual reduction in the reaction force applied to the pedal 10. By contrast, if the pedal 10 is depressed to the depressing limit position or further than the depressing limit position so that the answer of step S7 is YES, the routine returns. Consequently, the reaction force applied to the pedal 10 is reduced to the first reaction force, and the control of the reaction force is terminated.

Figure 6:
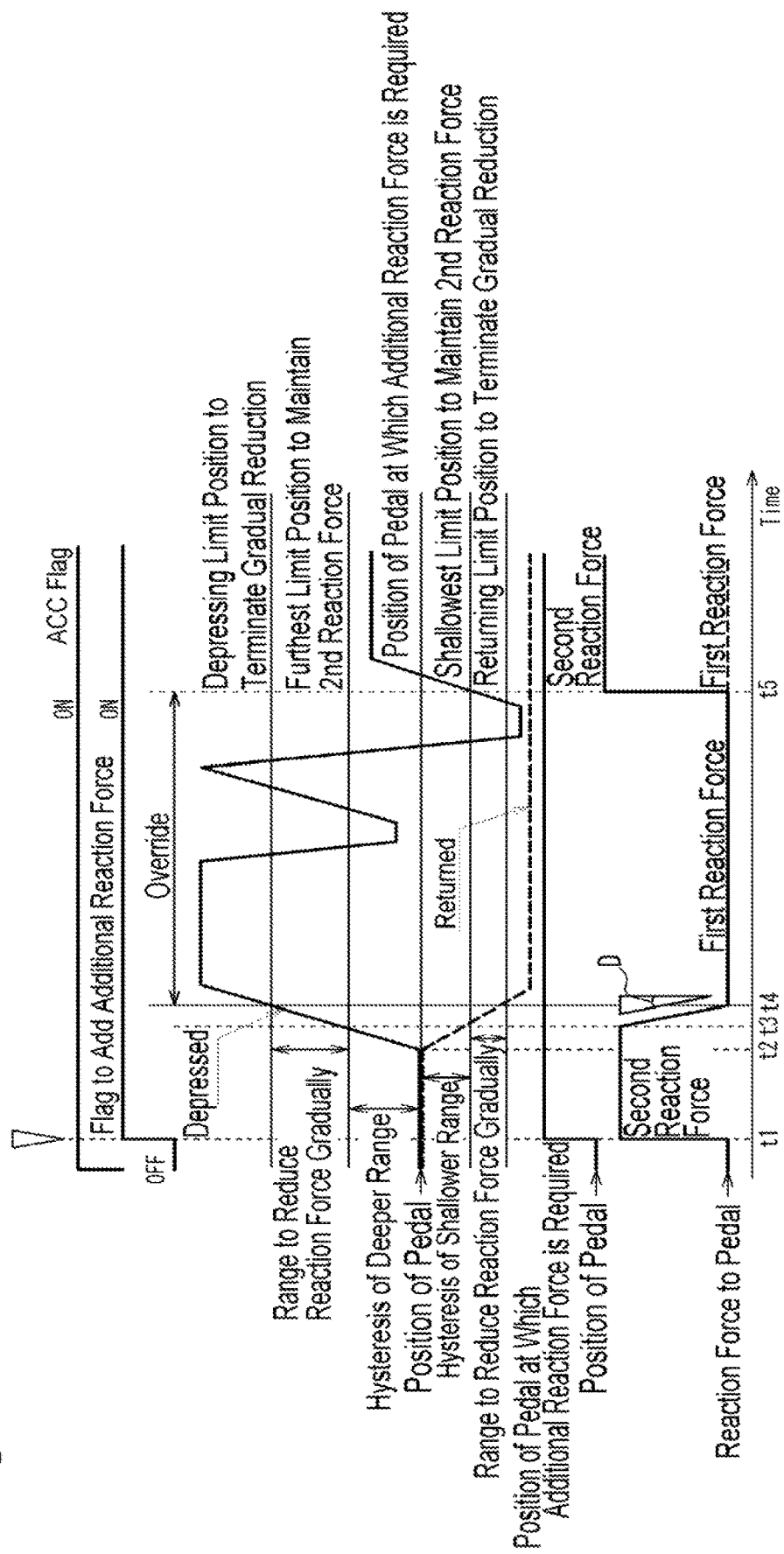
FIG. 6 is a time chart showing a temporal change in the reaction force applied to the pedal during execution of the routine shown in FIG. 5.

Turning to FIG. 6, there is shown a temporal change in the reaction force applied to the pedal 10 during execution of the routine shown in FIG. 5. In the example shown in FIG. 6, the vehicle 1 is propelled at a predetermined speed in the auto-cruise mode and hence the execution flag of the auto-cruise control (referred to as "ACC flag" in FIG. 6) is ON throughout the situation shown therein. When a satisfaction of the condition to add the additional reaction force to the first reaction force is determined at step S2 of the routine shown in FIG. 5, a flag to add the additional reaction force to the first reaction force is turned on at point t1 so that the reaction force applied to the pedal 10 is increased to the second reaction force. In this situation, if the driver merely puts his/her foot on the pedal pad 13 without depressing the pedal 10, a position of the pedal 10 is maintained by the reaction force thus increased to counteract the pedal force applied to the pedal 10. In addition, since the driver does not intend to depress or return the pedal 10 in this situation, the position of the pedal 10 is maintained around the current position.

Further, at point t1, the range (i.e., hysteresis) of position of the pedal 10 to maintain the reaction force applied to the pedal 10 to the second reaction force is set based on the current position of the pedal 10. Specifically, a position of the pedal 10 predetermined degrees further than the current position is set as the furthest limit position to maintain the reaction force to the second reaction force, and a position of the pedal 10 predetermined degrees closer to the initial position than the current position is set as a shallowest limit position to maintain the reaction force to the second reaction force. That is, a hysteresis of the deeper range is set between the current position of the pedal 10 and the furthest limit position to maintain the reaction force to the second reaction force, and a hysteresis of the shallower range is set between the current position of the pedal 10 and the shallowest limit position to maintain the reaction force to the second reaction force.

The pedal 10 is further depressed from the current position at point t2 as indicated by the solid line, and the position of the pedal 10 exceeds the range to maintain the second reaction force at point t3. Consequently, the routine shown in FIG. 5 progresses from step S5 to step S6, and the reaction force applied to the pedal 10 is reduced gradually to the first reaction force from point t3. According to the example shown in FIG. 6, the reaction force applied to the pedal 10 is reduced gradually from the second reaction force to the first reaction force in accordance with an increase in a depression of the pedal 10, at the rate D slower (or milder) than e.g., the above-mentioned calculated rate to reduce the reaction force immediately. Such reduction in the reaction force in this situation is also indicated in FIG. 4. As indicated by the solid downward line in FIG. 4, in the case that the pedal 10 is depressed further than the furthest limit position to maintain the reaction force to the second reaction force, the reaction force is reduced from the second reaction force indicated by the dashed line gradually to the first reaction force indicated by the solid line. According to the first control example, therefore, the driver will not feel any uncomfortable feeling due to abrupt change in the reaction force applied to the pedal 10.

When the pedal 10 is further depressed to the depressing limit position at point t4, the gradual reduction from the second reaction force to the first reaction force is terminated, and consequently the reaction force applied to the pedal 10 is reduced to the first reaction force. As a result of terminating the increasing control of the reaction force applied to the pedal 10, the vehicle 1 is brought into a so-called "overriding" state, and in this situation, the driver is allowed to control the drive force or the speed of the vehicle 1 by manipulating the pedal 10. That is, the drive force or the speed of the vehicle 1 is controlled in the same manner as before increasing the reaction force applied to the pedal 10 to the second reaction force. In this situation, therefore, the reaction force applied to the pedal 10 is maintained to the first reaction force even if the pedal 10 is depressed or returned.

After the pedal 10 is returned closer to the initial position than the shallowest limit position to maintain the reaction force to the second reaction force (or the hysteresis of the shallower range), the pedal 10 is depressed again to the shallowest limit position to maintain the reaction force to the second reaction force at point t5. In this situation, it is considered that an operation to depress the pedal 10 deeply has already been terminated, and in addition, the execution flag of the auto-cruise control is still on. That is, the condition to increase the reaction force applied to the pedal 10 is satisfied again. At point t5, therefore, the reaction force applied to the pedal 10 is increased again from the first reaction force to the second reaction force. In this situation, the pedal 10 is maintained within the range to maintain the second reaction force.

Second Control Example

Figure 7:
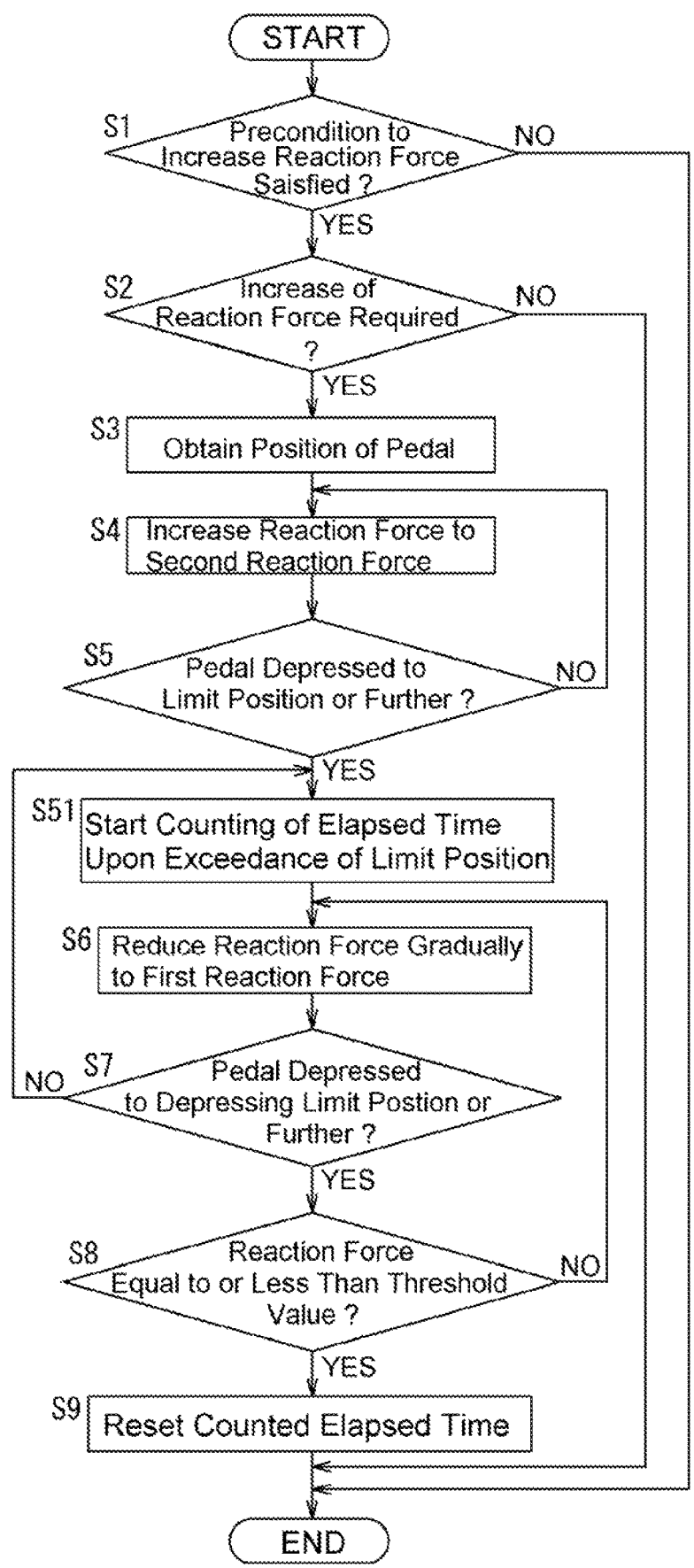
FIG. 7 is a flowchart showing a routine executed by the reaction force control system according to the second control example.

Here will be explained the second control example to reduce the reaction force applied to the pedal 10 gradually. Turning to FIG. 7, there is shown a routine in which a time is employed as a parameter to control the reaction force applied to the pedal 10. In the following explanation, detailed explanations for the streps in common with those in the routine shown in FIG. 5 will be omitted.

In the case that the pedal 10 is depressed to exceed the hysteresis of the deeper range while increasing the reaction force to the second reaction force so that the answer of step S5 is YES, the routine progresses to step S51 to start counting an elapsed time from a point at which a position of the pedal 10 exceeds the furthest limit position to maintain the reaction force applied to the pedal 10 to the second reaction force. Then, the gradual reduction of the reaction force applied to pedal 10 from the second reaction force to the first reaction force is commenced at step S6. According to the second control example, specifically, the reaction force applied to pedal 10 is reduced gradually from the second reaction force to the first reaction force with time. That is, the additional reaction force added to the first reaction force is reduced with time. In this case, the reaction force applied to pedal 10 may be reduced not only linearly but also exponentially.

If the pedal 10 is not depressed to the depressing limit position so that the answer of step S7 is NO, the routine returns to step S5 to continue the reduction in the reaction force. By contrast, if the position of the pedal 10 exceeds the depressing limit position so that the answer of step S7 is YES, the routine progresses to step S8 to determine whether the reaction force currently applied to the pedal 10 is equal to or less than a predetermined threshold value. In this case, the gradual reduction in the reaction force applied to the pedal 10 is to be terminated. However, if the command signal to reduce the reaction force applied to the pedal 10 to the first reaction force is transmitted immediately when the gradual reduction in the reaction force is terminated, the reaction force applied to the pedal 10 will be reduced immediately to the first reaction force irrespective of the gradual reduction control. That is, if the reaction force applied to the pedal 10 at the point when the pedal 10 exceeds the depressing limit position is significantly greater than the first reaction force, the reaction force applied to the pedal 10 will be reduced significantly and abruptly. In this case, the driver may experience a feeling of strangeness when operating the pedal 10.

In order to reduce such feeling of strangeness, according to the second control example, the gradual reduction control of the reaction force applied to the pedal 10 is continued if the reaction force currently applied to the pedal 10 is greater than the threshold value. To this end, for example, the threshold value may be set to a value at which the driver will not experience a feeling of strangeness even if the reaction force is reduced to the first reaction force, based on a result of experiment or simulation. If the reaction force currently applied to the pedal 10 is greater than the threshold value so that the answer of strep S8 is NO, the routine returns to step S6 to continue the gradual reduction in the reaction force applied to the pedal 10. By contrast, if the reaction force currently applied to the pedal 10 is equal to or less than the threshold value so that the answer of strep S8 is YES, the routine progresses to step S9 to terminate the gradual reduction in the reaction force applied to the pedal 10, and to reset the elapsed time counted from step S51. Consequently, the reaction force applied to the pedal 10 is reduced to the first reaction force, and the routine returns.

Figure 8:
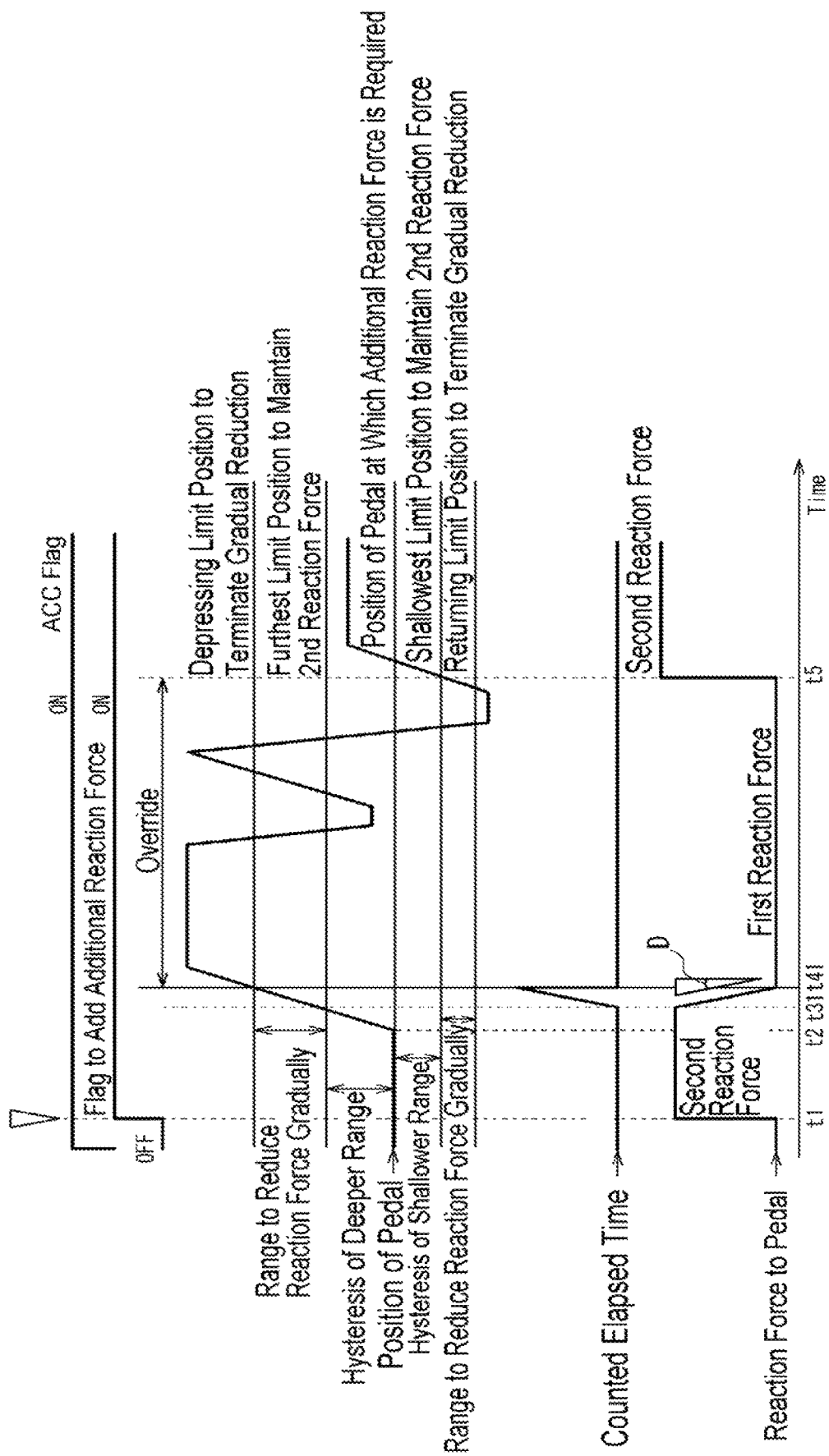
FIG. 8 is a time chart showing a temporal change in the reaction force applied to the pedal during execution of the routine shown in FIG. 7.

Turning to FIG. 8, there is shown a temporal change in the reaction force applied to the pedal 10 during execution of the routine shown in FIG. 7. Here, it is to be noted that the reaction force applied to the pedal 10 is increased by the same procedures as the first example, and hence the reaction force applied to the pedal 10 is changed in the same manner as the first example until point t2. Therefore, explanations for the same events as the first example will be simplified.

The pedal 10 is depressed from the current position at point t2, and the position of the pedal 10 exceeds the hysteresis of the deeper range (i.e., the furthest position to maintain the reaction force to the second reaction force) at point t31. Consequently, the counting of the elapsed time is started at point t31. That is, the gradual reduction in the reaction force applied to the pedal 10 from the second reaction force to the first reaction force is started from point t31. As a result, the reaction force applied to the pedal 10 is reduced from the second reaction force at the rate D, and the reaction force is reduced to the first reaction force at point t41. That is, the gradual reduction in the reaction force applied to the pedal 10 is terminated and the counted elapsed time is reset at point t41. The subsequent changes in the position of the pedal 10 and the reaction force applied to the pedal 10 are similar to those in the example shown in FIG. 6.

Thus, according to the second control example, the reaction force applied to the pedal 10 is reduced gradually from the second reaction force to the first reaction force with time. According to the second control example, therefore, the reaction force applied to the pedal 10 is not changed abruptly, and such change in the reaction force applied to the pedal 10 will not be sensed by the driver. That is, the reaction force applied to the pedal 10 is changed without reducing operability of the pedal 10.

Third Control Example

Here will be explained the third control example to be executed when returning the pedal 10 with reference to FIG. 9. According to the third control example, the reaction force applied to the pedal 10 is increased to the second reaction force by the came procedures as the first example. Therefore, detailed explanations for the steps S1 to S4 in common with those in the routine shown in FIG. 5 will be omitted.

After increasing the reaction force applied to the pedal 10 to the second reaction force at step S4, it is determined at step S10 whether the pedal 10 is returned to the shallowest limit position to maintain the reaction force to the second reaction force, or closer to the initial position than the shallowest limit position. According to the third control example, the range of position (i.e., stroke or depression) of the pedal 10 in which the second reaction force is maintained (i.e., the hysteresis) is also set, and the shallowest limit position is a shallowest position of the pedal 10 in the range in which the second reaction force is maintained. The range in which the second reaction force is maintained and the shallowest limit position of the pedal 10 in the range to maintain the second reaction force may be set based on a result of experiment or simulation. For example, the shallowest limit position of the pedal 10 to maintain the second reaction force may be set to a shallowest position in a range of a movement of the right foot of the driver while the driver propels the vehicle at a substantially constant speed. In this case, such range of a movement of the right foot of the driver may be found based on a result of experiment or simulation. That is, the shallowest limit position of the pedal 10 to maintain the second reaction force is set to the position at which a fact that the driver returns the pedal 10 with the intention to decelerate the vehicle 1 can be determined.

If the pedal 10 is not returned to the shallowest limit position to maintain the reaction force to the second reaction force so that the answer of step S10 is NO, this means that the position of the pedal 10 is still maintained within the range to maintain the second reaction force. In this case, therefore, the routine returns to step S4 to maintain the second reaction force. By contrast, if the pedal 10 is returned to the shallowest limit position or closer to the initial position than the shallowest limit position so that the answer of step S10 is YES, this means that the condition to maintain the reaction force applied to the pedal 10 to the second reaction force is no longer satisfied. In this case, therefore, the routine progresses to step S11 to reduce the reaction force applied to pedal 10 gradually from the second reaction force to the first reaction force. For example, the reaction force applied to pedal 10 may be reduced from the second reaction force to the first reaction force at the rate in which the driver will not experience a feeling of strangeness when operating the pedal 10, by the same procedures as step S6 of the routine shown in FIG. 5.

Thereafter, it is determined at step S12 whether the pedal 10 is returned to a returning limit position at which the gradual reduction in the reaction force applied to the pedal 10 is terminated, or closer to the initial position than the returning limit position. That is, the returning limit position is a shallowest position in the range of position of the pedal 10 to reduce the reaction force applied to the pedal 10 gradually from the first reaction force to the second reaction force. In other words, an upper limit value of a change amount in a position of the pedal 10 to reduce the reaction force gradually from the first reaction force to the second reaction force is defined by the returning limit position. Specifically, the returning limit position is set to a position at which the driver will not feel any uncomfortable feeling during a period of time to reduce the reaction force gradually from the second reaction force to the first reaction force. If the pedal 10 is not returned to the returning limit position so that the answer of step S12 is NO, the routine returns to step S10 to continue the reduction in the reaction force. By contrast, if the pedal 10 is returned to the returning limit position so that the answer of step S12 is YES, the routine returns. Consequently, the reaction force applied to the pedal 10 is reduced to the first reaction force, and the control of the reaction force is terminated.

Figure 9:
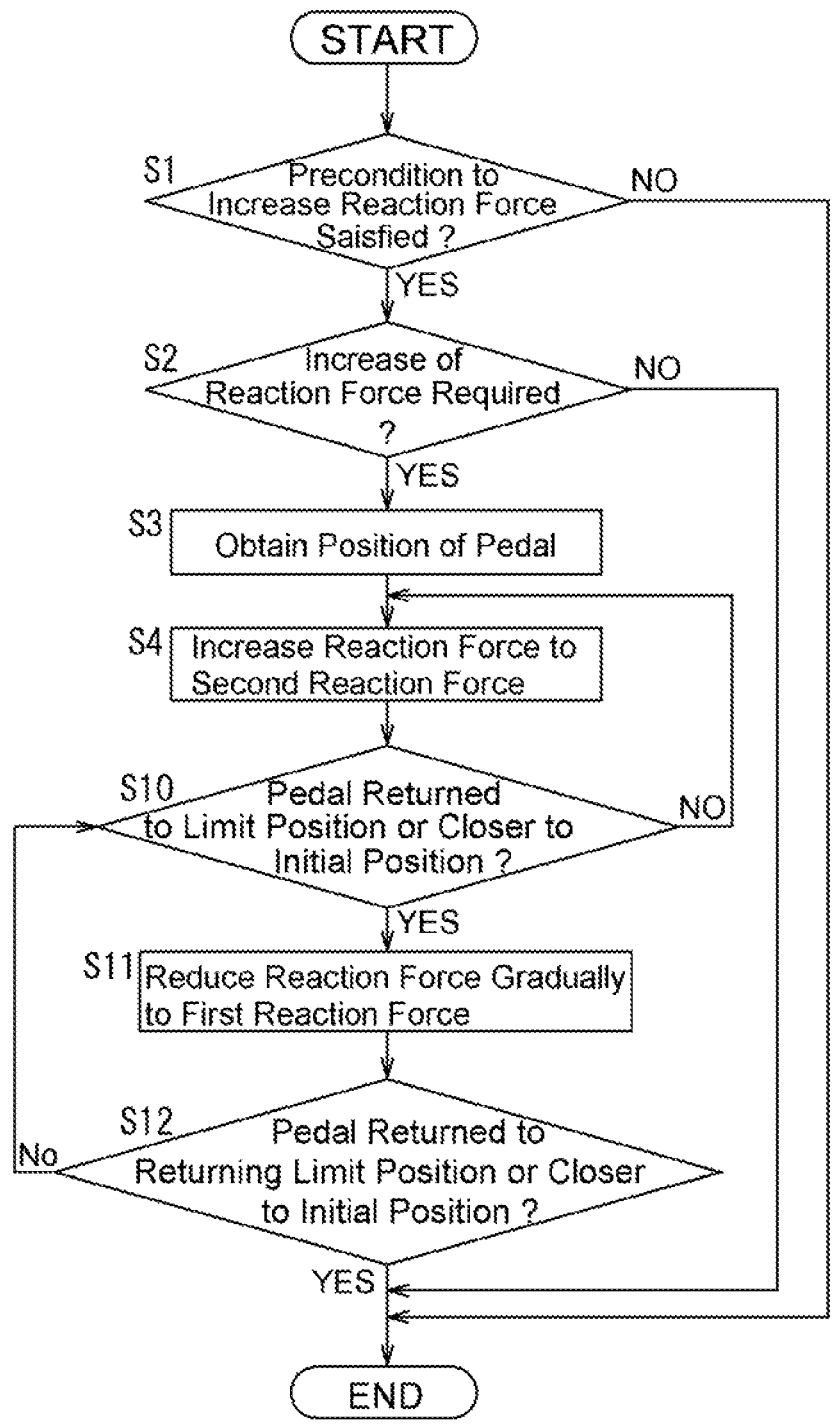
FIG. 9 is a flowchart showing a routine executed by the reaction force control system according to the third control example.

A temporal change in the reaction force applied to the pedal 10 during execution of the routine shown in FIG. 9 is also shown in FIG. 6. In the example shown in FIG. 6, a speed of returning the pedal 10 is slower than a sped of depressing the pedal 10, and timings to start and terminate the gradual reduction in the reaction force by returning the pedal 10 are identical to those of the case of depressing the pedal 10.

As described, the reaction force applied to the pedal 10 is increased to the second reaction force at point t1. The pedal 10 is returned at point t2, and the reaction force applied to the pedal 10 is reduced from point t3 at which the pedal 10 is returned to the shallowest limit position to maintain the reaction force to the second reaction force. In this situation the reaction force applied to pedal 10 is reduced gradually from the second reaction force to the first reaction force in the same manner as the case of depressing the pedal 10 at the rate D, in accordance with a change in the position of the pedal 10, the pedal force applied to the pedal 10, the elapsed time, or a predetermined function. When the pedal 10 is returned to the returning limit position at point t4, the gradual reduction in the reaction force applied to the pedal 10 is terminated, and the reaction force is reduced to the first reaction force. In the case of returning the pedal 10 in the example shown in FIG. 6, the position of the pedal 10 is maintained to a predetermined shallow position, therefore, the reaction force applied to the pedal 10 is maintained to the first reaction force after point t5 as indicated by the dashed line.

Such change in the reaction force applied to the pedal 10 in the case of returning the pedal 10 is also indicated in FIG. 4. In this case, as indicated by the solid upward line in the returning direction, the reaction force is reduced from the second reaction force indicated by the dashed line in the returning direction gradually to the first reaction force indicated by the solid line in the returning direction. According to the third control example, therefore, the driver will not feel any uncomfortable feeling due to abrupt change in the reaction force applied to the pedal 10.

Fourth Control Example

As explained, according to the routine shown in FIG. 9, the gradual reduction in the reaction force applied to the pedal 10 from the second reaction force to the first reaction force is started when the pedal 10 is returned to the shallowest limit position to maintain the second reaction force. By contrast, according to the fourth control example, such gradual reduction in the reaction force applied to the pedal 10 may be started upon cancellation of the precondition to increase the reaction force applied to the pedal 10 from the first reaction force to the second reaction force. For example, if the pedal 10 to which the second reaction force is applied is returned and consequently the auto-cruise mode is cancelled, the answer of step S10 of the routine shown in FIG. 9 will be YES. That is, the precondition to increase the reaction force applied to the pedal 10 from the first reaction force to the second reaction force is cancelled, and the condition to reduce the reaction force applied to the pedal 10 from the second reaction force to the first reaction force is satisfied. Then, at steps S11 and S12 of the routine shown in FIG. 9, the reaction force applied to the pedal 10 is reduced gradually from the second reaction force to the first reaction force at the rate D in accordance with a change in the position of the pedal 10.

Fifth Control Example

In the foregoing examples, the gradual reduction in the reaction force applied to the pedal 10 is started based on a change in the position of the pedal 10. By contrast, according to the fifth control example, such gradual reduction in the reaction force applied to the pedal 10 may be started when the precondition to increase the reaction force applied to the pedal 10 from the first reaction force to the second reaction force is no longer satisfied. The fifth control example will be explained with reference to FIGS. 10 and 11. At step S20, the reaction force applied to the pedal 10 is increased from the first reaction force to the second reaction force. As explained, the reaction force applied to the pedal 10 is increased from the first reaction force to the second reaction force in the case that the precondition to increase the reaction force applied to the pedal 10 from the first reaction force to the second reaction force is satisfied, and that the additional reaction force is required to be added to the first reaction force. Then, it is determined at step S21 whether the precondition to increase the reaction force applied to the pedal 10 from the first reaction force to the second reaction force is still satisfied. For example, it is determined at step S21 whether the vehicle 1 is still propelled in the auto-cruise mode.

If the precondition to increase the reaction force applied to the pedal 10 from the first reaction force to the second reaction force is still satisfied so that the answer of step S21 is YES, the routine returns to step S20 to maintain the second reaction force. By contrast, if the precondition to increase the reaction force applied to the pedal 10 from the first reaction force to the second reaction force is no longer satisfied so that the answer of step S21 is NO, the routine progresses to step S22 to start counting of an elapsed time from a point at which the precondition is no longer satisfied. Then, at step S23, the reaction force applied to the pedal 10 is reduced gradually from the second reaction force to the first reaction force in accordance with the elapsed time. Thus, when the precondition to increase the reaction force applied to the pedal 10 from the first reaction force to the second reaction force is cancelled, the gradual reduction in the reaction force applied to pedal 10 from the second reaction force to the first reaction force is commenced. Specifically, the additional reaction force applied to the pedal 10 is reduced with an increase in the counted elapsed time so that the reaction force applied to the pedal 10 is reduced toward the first reaction force. According to the fifth example, optionally, a fact that the pedal 10 is returned may also be employed as the condition to reduce the reaction force applied to the pedal 10 from the first reaction force to the second reaction force. Accordingly, the precondition to increase the reaction force applied to the pedal 10 from the first reaction force to the second reaction force, and the selection of the auto-cruise mode corresponds to the "preconditional control" of the embodiment, and the request to add the additional reaction force to the first reaction force corresponds to the "starting condition" of the embodiment.

Then, it is determined at step S24 whether the reaction force currently applied to the pedal 10 is equal to or less than the predetermined threshold value. That is, same determination as step S8 of the routine shown in FIG. 7 is made at step S24 so as to determine whether the reaction force applied to the pedal 10 is reduced to the level at which the driver will not feel uncomfortable feeling even if the reaction force applied to the pedal 10 is reduced to the first reaction force. If the reaction force currently applied to the pedal 10 is greater than the threshold value so that the answer of strep S24 is NO, the routine returns to step S22 to continue the gradual reduction in the reaction force applied to the pedal 10. By contrast, if the reaction force currently applied to the pedal 10 is equal to or less than the threshold value so that the answer of strep S24 is YES, the routine progresses to step S25 to terminate the gradual reduction in the reaction force applied to the pedal 10, and to reset the counted elapsed time. Consequently, the reaction force applied to the pedal 10 is reduced to the first reaction force, and the routine returns.

Figure 10:
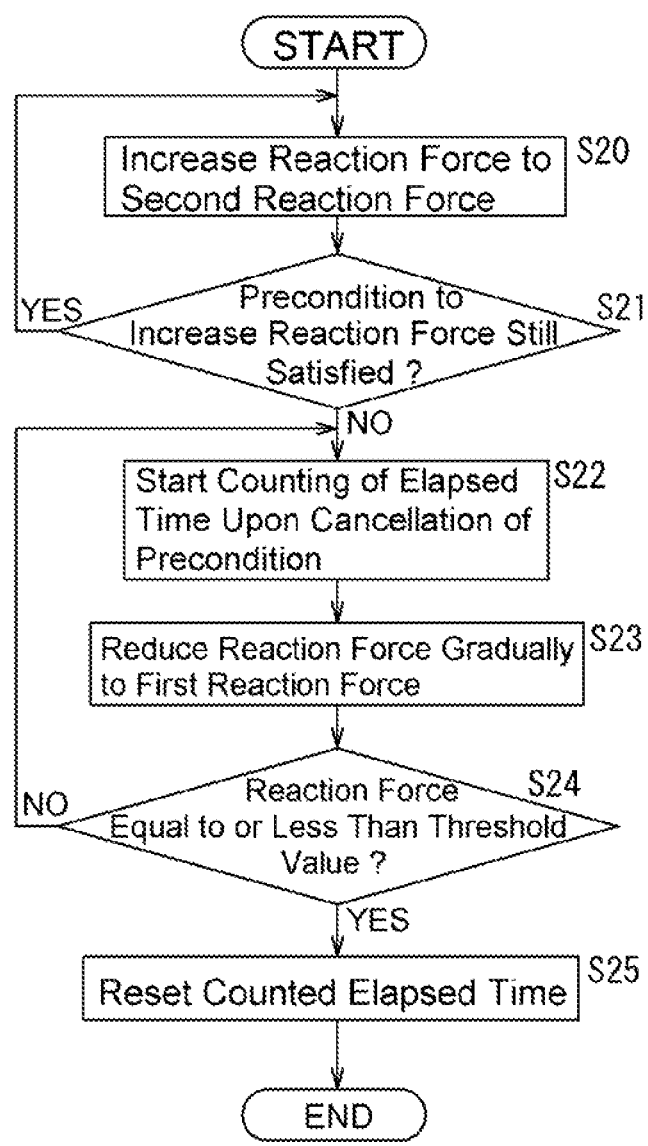
FIG. 10 is a flowchart showing a routine executed by the reaction force control system according to the fifth control example.
Figure 11:
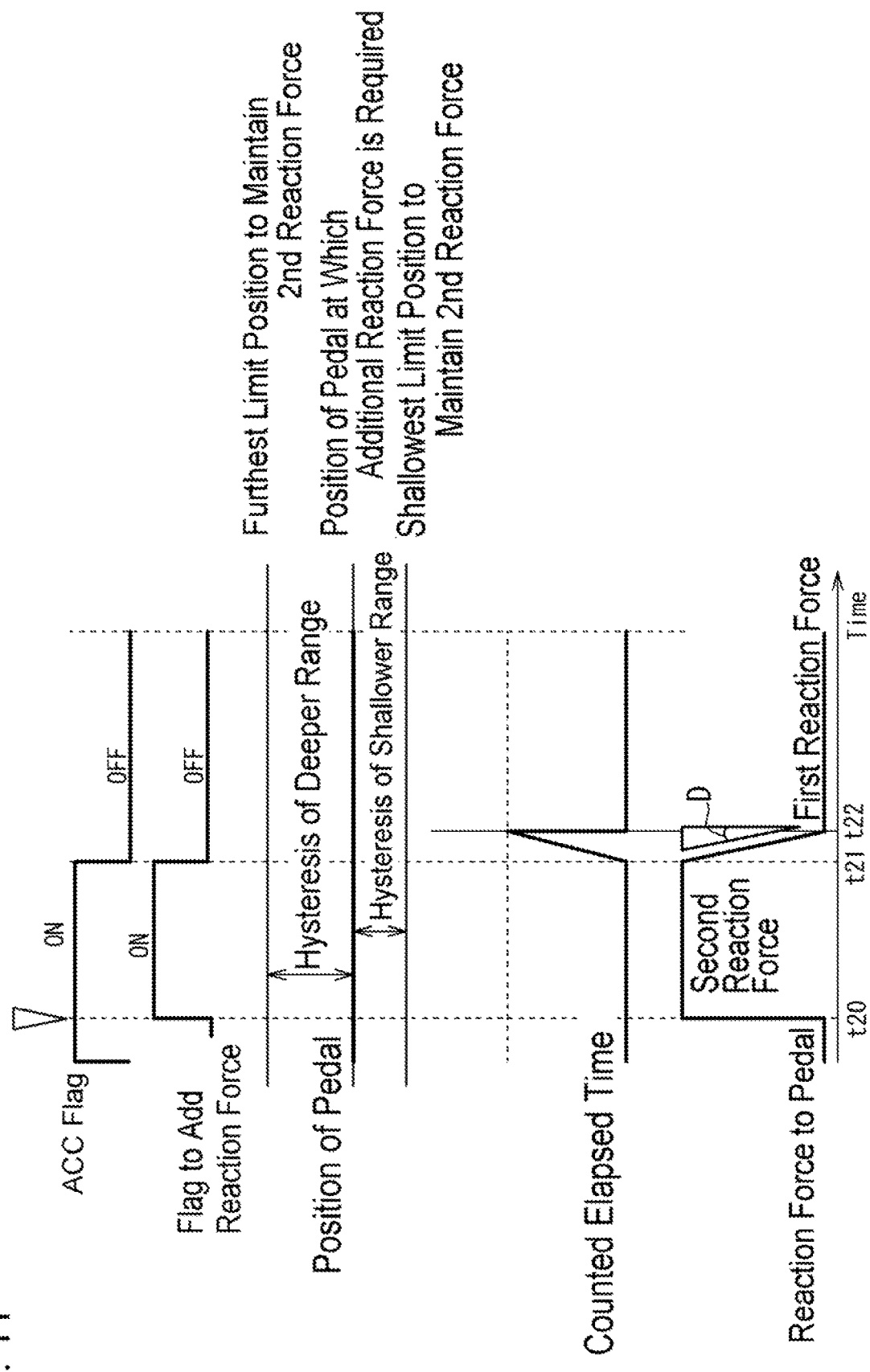
FIG. 11 is a time chart showing a temporal change in the reaction force applied to the pedal during execution of the routine shown in FIG. 10.

Turning to FIG. 11, there is shown a temporal change in the reaction force applied to the pedal 10 during execution of the routine shown in FIG. 10. In the example shown in FIG. 11, the flag to execute the preconditional control (e.g., the auto-cruise control) to increase the reaction force applied to the pedal 10 the second reaction force is turned on before point t20. Consequently, a flag to add the additional reaction force to the first reaction force is turned on at point t20, and the reaction force applied to the pedal 10 is increased from the first reaction force to the second reaction force by the above-explained procedures.

When the preconditional control such as the auto-cruise control is cancelled at point t21, the flag to add the additional reaction force to the first reaction force is turned off. Consequently, the counting of the elapsed time is started at point t21, and the reaction force applied to the pedal 10 is reduced gradually from the second reaction force to the first reaction force at the rate D in accordance with the elapsed time. When the reaction force applied to the pedal 10 is reduced to the threshold value at point t22, the gradual reduction in the reaction force applied to the pedal 10 is terminated so that the reaction force applied to the pedal 10 is set to the first reaction force, and the counted elapsed time is reset. Changes in the counted elapsed time and the reaction force applied to the pedal 10 during the period from point t21 to t22 are similar to those in the example shown in FIG. 8.

Sixth Control Example

In a case of operating the pedal 10 to which the second reaction force is applied, the operation of the pedal 10 may be changed in response to the changing situation. For example, in a case of depressing the pedal 10 to which the second reaction force is applied to accelerate the vehicle 1, the pedal 10 being depressed by the driver may be returned or maintained to a predetermined position for some reason. By contrast, in a case of returning the pedal 10 to which the second reaction force is applied to decelerate the vehicle 1, the pedal 10 being returned by the driver may be depressed or maintained to a predetermined position for some reason. In those cases, the reaction force applied to the pedal 10 may be controlled by the following procedures.

Figure 12:
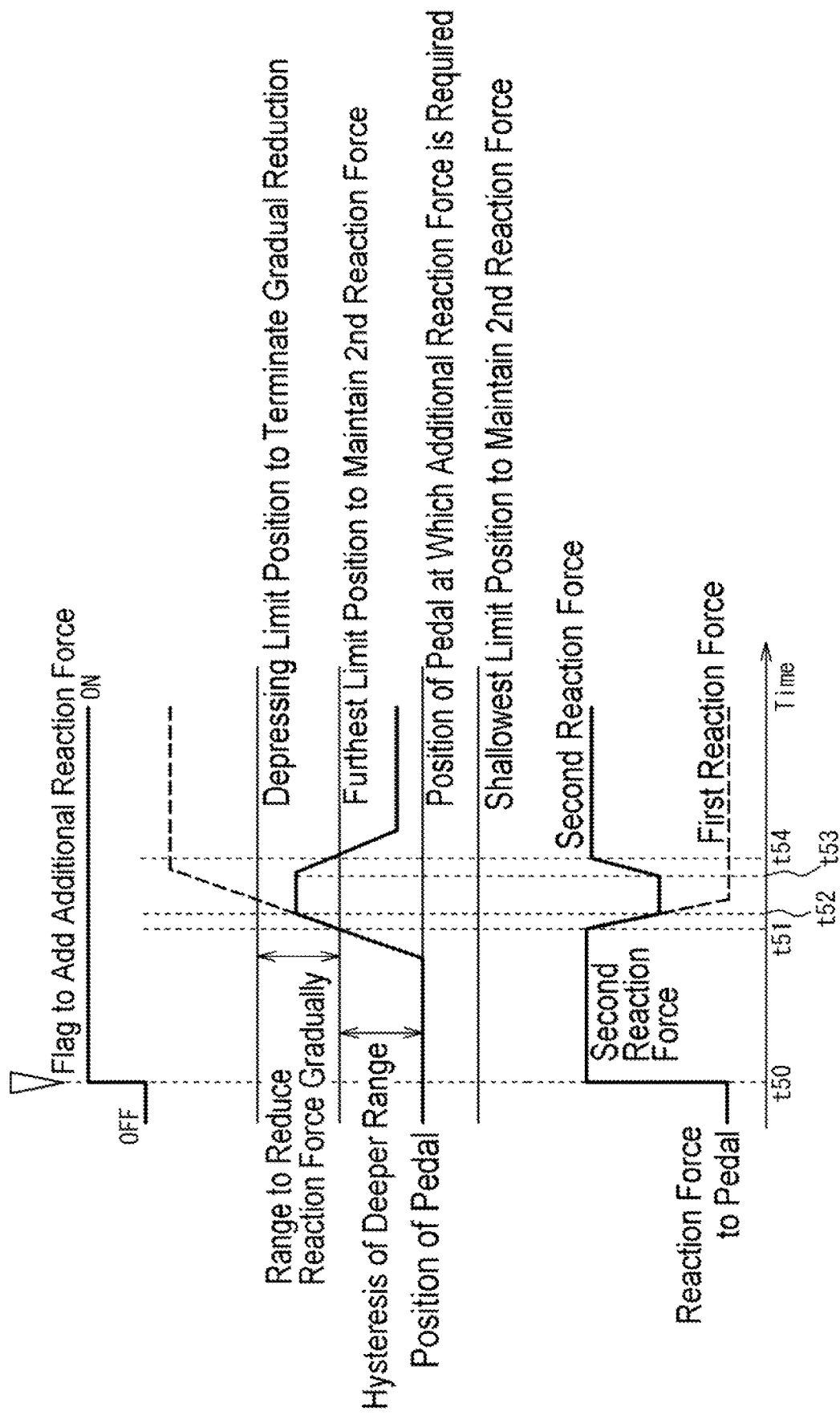
FIG. 12 is a time chart showing a temporal change in the reaction force applied to the pedal according the sixth control example.

Turning to FIG. 12, there is shown an example of a temporal change in the reaction force applied to the pedal 10, in a case of depressing the pedal 10 to which the second reaction force is applied, and then stopping and returning the pedal 10. In the example shown in FIG. 12, the flag to add the additional reaction force to the first reaction force is turned on at point t50, and consequently the reaction force applied to the pedal 10 is increased to the second reaction force. When the pedal 10 is depressed further than the hysteresis of the deeper range at point t51 so as to accelerate the vehicle 1, the reaction force applied to the pedal 10 is reduced gradually from the second reaction force. Then, the pedal 10 is stopped before depressed to the depressing limit position at point t52, and a position of the pedal 10 is maintained from point t52. That is, an intention of the driver to operate the pedal 10 has changed.

The position of the pedal 10 is maintained substantially to a predetermined position for a predetermined period of time, and then the pedal 10 is returned at point t53. In this situation, the reaction force applied to the pedal 10 is maintained to a magnitude at point t52 (i.e., to a magnitude between the first reaction force and the second reaction force), and as a result of returning the pedal 10, the reaction force applied to the pedal 10 is increased toward the second reaction force in accordance with a change in the position of the pedal 10. Then, when the pedal 10 is returned to the position at which the reaction force applied to the pedal 10 was reduced from the second reaction force at point t54, the reaction force applied to the pedal 10 is increased to the second reaction force and maintained to the second reaction force. In the example shown in FIG. 12, after starting to reduce the reaction force applied to the pedal 10, the reaction force is controlled in accordance with the position of the pedal 10 until the reaction force applied to the pedal 10 is increased to the second reaction force again. Specifically, the reaction force applied to the pedal 10 is reduced gradually from the second reaction force toward the first reaction force in accordance with a depression of the pedal 10, and maintained to a constant magnitude in accordance with the position of the stopping pedal 10, and then increased again.

Seventh Control Example

Figure 13:
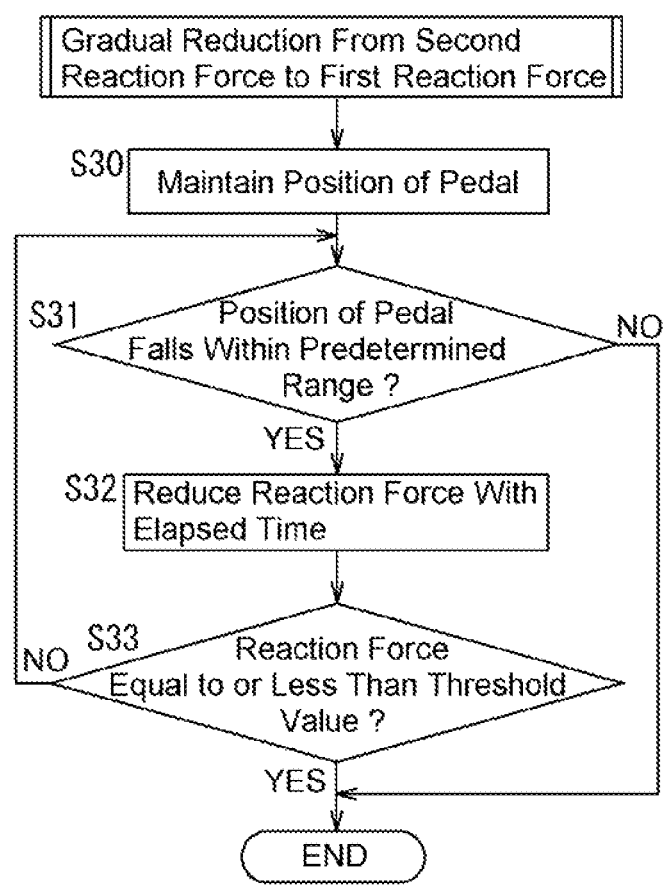
FIG. 13 is a flowchart showing a routine executed by the reaction force control system according to the seventh control example.

Next, here will be explained the seventh example to control the reaction force applied to the pedal 10 in a case that the pedal 10 is stopped (or maintained) within a predetermined range in the process of reducing the reaction force applied to the pedal 10 from the second reaction force to the first reaction force, with reference to FIG. 13. The routine shown in FIG. 13 is executed when a position of the pedal 10 is depressed or returned to exceed the hysteresis of the deeper range or the shallower range (that is, the range of position to maintain the second reaction force) so that the gradual reduction in the reaction force from the second reaction force to the first reaction force is commenced. At step S30, a current position of the pedal 10 being maintained is obtained. Then, it is determined at step S31 whether the current position of the pedal 10 being maintained falls within a predetermined range. The predetermined range includes a predetermined deeper range X1(%) from a position α1 of the pedal 10 being held, and a predetermined shallower range X2(%) from the position α1 of the pedal 10 being held. At step S31, specifically, it is determined whether the current position α0 of the pedal being 10 falls within the following range:

$$\alpha 1 \cdot (1+X2) < \alpha 0 \leq \alpha 1 \cdot (1-X1),$$

and whether the position of the detected position of the pedal 10 is not changed for a predetermined period of time. For example, such determination at step S31 may be made by comparing a difference between a previous position and a current position of the pedal 10 with a predetermined criterion value. In this case, if the difference between the previous position and the current position of the pedal 10 is greater than the criterion value, it can be considered that the position of the pedal 10 is changed. By contrast, if the difference between the previous position and the current position of the pedal 10 is smaller than the criterion value, it can be considered that the position of the pedal 10 is maintained to a certain position.

If the current position of the pedal 10 is not maintained within the predetermined range for the predetermined period of time so that the answer of step S31 is NO, this means that the pedal 10 is being depressed or returned. In this case, therefore, the routine returns and the gradual reduction in the reaction force is continued. By contrast, if the current position of the pedal 10 is maintained within the predetermined range for the predetermined period of time so that the answer of step S31 is YES, the routine progresses to step S32 to reduce the reaction force applied to the pedal 10 gradually from the second reaction force to the first reaction force in accordance with an elapsed time from a point at which an affirmative determination has been made at step S31. Thereafter, it is determined at step S33 whether the reaction force applied to the pedal 10 is equal to or less than the predetermined threshold value. That is, same determination as step S8 of the routine shown in FIG. 7 is made at step S33. If the reaction force applied to the pedal 10 is greater than the threshold value so that the answer of strep S33 is NO, the routine returns to step S31 to repeat the determination of the position of the pedal 10. By contrast, if the reaction force applied to the pedal 10 is equal to or less than the threshold value so that the answer of strep S33 is YES, this means that the reaction force applied to the pedal 10 has been reduced to the first reaction force. In this case, therefore, the gradual reduction in the reaction force is terminated, and the routine returns.

Eighth Control Example

Figure 14:
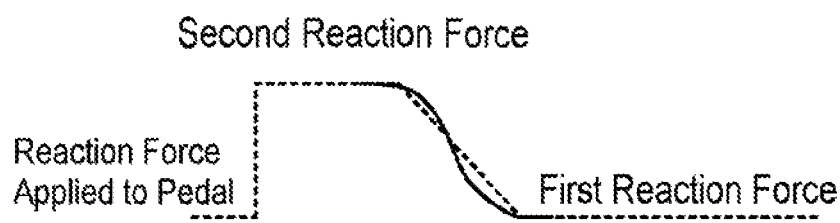
FIG. 14 is a graph indicating a change in the reaction force applied to the pedal according to the eighth control example.

As described, according to the exemplary embodiment of the present disclosure, the reaction force applied to the pedal 10 may also be changed in a quadratic manner, instead of changing the reaction force linearly as indicated in the foregoing time charts. For example, as indicated in FIG. 14, the reaction force applied to the pedal 10 may be changed non-linearly in such a manner that the reaction force is changed smoothly at the point at which the reduction in the reaction force is commenced and at the point at which the reduction in the reaction force is terminated.

Ninth Control Example

According to the ninth control example, a magnitude of the second reaction force may be set arbitrarily according to a running condition of the vehicle 1 and a condition of a road surface. For example, in a condition in which it is not preferable to depress the pedal 10 deeply or abruptly, the second reaction forcer may be increased. In this case, the hysteresis to maintain the reaction force to the second reaction force is set only in the shallower range, and the hysteresis may not be set in the deeper range. In this case, therefore, the second reaction force is reduced by depressing the pedal 10, and increased by returning the pedal 10.

Figure 15:
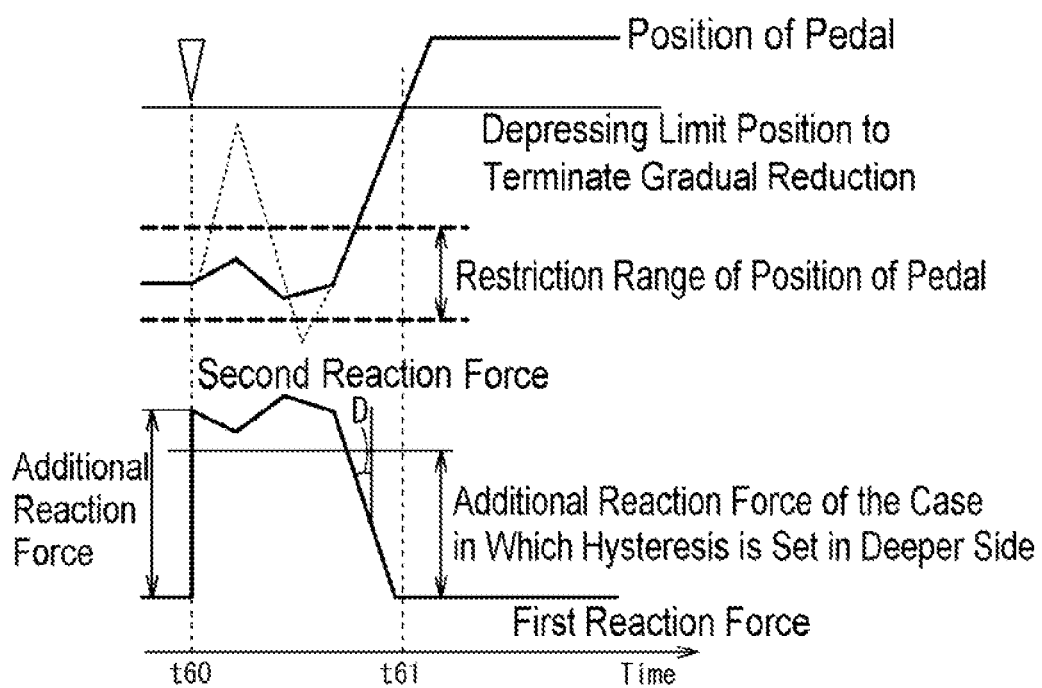
FIG. 15 is a time chart showing a temporal change in the reaction force applied to the pedal according the ninth control example.

A temporal change in the second reaction force according to the ninth control example is shown in FIG. 15. When the condition to increase the reaction force applied to the pedal 10 is satisfied at point t60 in the situation that the pedal 10 is maintained to a predetermined position, the additional reaction force is added to the first reaction force so that the reaction force is increased to the second reaction force. According to the ninth control example, the additional reaction force added to the first reaction force is greater than the additional reaction force of the foregoing control examples in which the hysteresis of the deeper range is set. In this situation, the reaction force applied to the pedal 10 is reduced by depressing the pedal 10 and increased by returning the pedal 10. In other words, the reaction force applied to the pedal 10 is changed gradually in accordance with a position of the pedal 10. When the pedal 10 is depressed deeply to the depressing limit position to terminate the gradual reduction in the reaction force applied to the pedal 10 at point t61, the gradual reduction in the reaction force is terminated and the reaction force is maintained to the first reaction force.

Although the above exemplary embodiments of the present disclosure have been described, it will be understood by those skilled in the art that the present disclosure should not be limited to the described exemplary embodiments, and various changes and modifications can be made within the scope of the present disclosure. For example, the above-explained controls involved in the gradual reduction in the reaction force applied to the pedal 10 may also be commenced and terminated based on a pedal force applied to the pedal 10, instead of a position of the pedal 10. In addition, the reaction force control system according to the exemplary embodiment of the present disclosure may also be applied to a hybrid vehicle in which a prime mover includes an internal combustion engine and a motor, and an in-wheel motor vehicle in which each wheel is individually provided with a motor.

What is claimed is:

1. A reaction force control system for a pedal, comprising:
a pedal that controls a driving condition of a vehicle; and
a reaction force generator that generates a reaction force against a pedal force applied to the pedal, and that changes the reaction force,
wherein the reaction force control system is configured to select the reaction force applied to the pedal from at least a first reaction force that is selected during normal propulsion of the vehicle, and a second reaction force that is greater than the first reaction force,
the reaction force control system comprises a controller that controls the reaction force applied to the pedal, and
the controller is configured to
determine a satisfaction of a condition to reduce the reaction force applied to the pedal from the second reaction force to the first reaction force in a case that the second reaction force is selected, and
execute a gradual reduction control to reduce the reaction force applied to the pedal gradually from the second reaction force to the first reaction force at a rate slower than a rate to reduce the reaction force applied to the pedal immediately from the second reaction force to the first reaction force;
detect the depression of the pedal or the pedal force applied to the pedal during execution of the gradual reduction control,
determine that the depression of the pedal or the pedal force applied to the pedal is not changed for a predetermined period of time, or that the depression of the pedal or the pedal force applied to the pedal being increased is reduced, and
increase the reaction force applied to the pedal to the second reaction force, if the depression of the pedal or the pedal force applied to the pedal is not changed for the predetermined period of time, or the depression of the pedal or the pedal force applied to the pedal being increased is reduced during execution of the gradual reduction control.

2. The reaction force control system for the pedal as claimed in claim 1, wherein the condition to reduce the reaction force applied to the pedal from the second reaction force to the first reaction force includes:
a fact that a depression of the pedal is increased or decreased from a position of the pedal at a point when the reaction force applied to the pedal was increased to the second reaction force; and
a fact that the pedal force applied to the pedal is increased or decreased from a pedal force applied to the pedal at the point when the reaction force applied to the pedal was increased to the second reaction force.

3. The reaction force control system for the pedal as claimed in claim 1, wherein the gradual reduction control includes a control to reduce the reaction force applied to the pedal gradually from the second reaction force to the first reaction force at a rate slower than a rate to reduce the reaction force immediately from the second reaction force to the first reaction force in response to a transmission of the command signal to reduce the reaction force.

4. The reaction force control system for the pedal as claimed in claim 1, wherein the gradual reduction control includes:
a control to reduce the reaction force applied to the pedal gradually from the second reaction force to the first reaction force in accordance with a change in any one of the depression of the pedal, the pedal force applied to the pedal, an elapsed time from a point at which the condition to reduce the reaction force from the second reaction force to the first reaction force has been satisfied, and a non-linear function determined employing any one of the depression of the pedal, the pedal force applied to the pedal and the elapsed time as a parameter.

5. The reaction force control system for the pedal as claimed in claim 4,
wherein the controller is further configured to set a range of the depression of the pedal or the pedal force applied to the pedal in which the second reaction force is maintained without executing the gradual reduction control, even if the depression of the pedal or the pedal force applied to the pedal is changed, and
the condition to reduce the reaction force applied to the pedal from the second reaction force to the first reaction force includes a fact that the depression of the pedal or the pedal force applied to the pedal is changed to exceed the range of the depression of the pedal or the pedal force applied to the pedal in which the second reaction force is maintained.

6. The reaction force control system for the pedal as claimed in claim 5, wherein the elapsed time from the point at which the condition to reduce the reaction force from the second reaction force to the first reaction force has been satisfied includes an elapsed time counted from a point at which the change in the depression of the pedal or the pedal force applied to the pedal exceeds the range of the depression of the pedal or the pedal force applied to the pedal in which the second reaction force is maintained.

7. The reaction force control system for the pedal as claimed in claim 1,
wherein the controller is further configured to set a range of the depression of the pedal or the pedal force applied to the pedal in which the second reaction force is maintained without executing the gradual reduction control, even if the depression of the pedal or the pedal force applied to the pedal is changed, and
the condition to reduce the reaction force applied to the pedal from the second reaction force to the first reaction force includes a fact that the depression of the pedal or the pedal force applied to the pedal is changed to exceed the range of the depression of the pedal or the pedal force applied to the pedal in which the second reaction force is maintained.

8. The reaction force control system for the pedal as claimed in claim 7, wherein the range of the depression of the pedal or the pedal force applied to the pedal in which the second reaction force is maintained is set only in a range from the position of the pedal or the pedal force applied to the pedal at which the second reaction force was selected, in a direction to reduce the depression of the pedal or the pedal force applied to the pedal.

9. The reaction force control system for the pedal as claimed in claim 1, wherein the controller is further configured to increase the reaction force applied to the pedal to the second reaction force if a predetermined preconditional control has been commenced and a starting condition to increase the reaction force applied to the pedal to the second reaction force is satisfied, and execute the gradual reduction control if the preconditional control has been cancelled and the depression of the pedal or the pedal force applied to the pedal is reduced in a situation that the second reaction force is applied to the pedal.

10. A reaction force control system for a pedal, comprising:

a pedal that controls a driving condition of a vehicle; and a reaction force generator that generates a reaction force against a pedal force applied to the pedal, and that changes the reaction force, wherein the reaction force control system is configured to select the reaction force applied to the pedal from at least a first reaction force that is selected during normal propulsion of the vehicle, and a second reaction force that is greater than the first reaction force, the reaction force control system comprises a controller that controls the reaction force applied to the pedal, and the controller is configured to determine a satisfaction of a condition to reduce the reaction force applied to the pedal from the second reaction force to the first reaction force in a case that the second reaction force is selected, and execute a gradual reduction control to reduce the reaction force applied to the pedal gradually from the second reaction force to the first reaction force at a rate slower than a rate to reduce the reaction force applied to the pedal immediately from the second reaction force to the first reaction force;

increase the reaction force applied to the pedal to the second reaction force if a predetermined preconditional control has been commenced and a starting condition to increase the reaction force applied to the pedal to the second reaction force is satisfied, and execute the gradual reduction control if the preconditional control has been cancelled and the depression of the pedal or the pedal force applied to the pedal is reduced in a situation that the second reaction force is applied to the pedal, wherein the gradual reduction control includes a control to reduce the reaction force applied to the pedal gradually from the second reaction force to the first reaction force in accordance with a change in the depression of the pedal or the pedal force applied to the pedal.

11. A reaction force control system for a pedal, comprising:

a pedal that controls a driving condition of a vehicle; and a reaction force generator that generates a reaction force against a pedal force applied to the pedal, and that changes the reaction force, wherein the reaction force control system is configured to select the reaction force applied to the pedal from at least a first reaction force that is selected during normal propulsion of the vehicle, and a second reaction force that is greater than the first reaction force, the reaction force control system comprises a controller that controls the reaction force applied to the pedal, and the controller is configured to determine a satisfaction of a condition to reduce the reaction force applied to the pedal from the second reaction force to the first reaction force in a case that the second reaction force is selected, and execute a gradual reduction control to reduce the reaction force applied to the pedal gradually from the second reaction force to the first reaction force at a rate slower than a rate to reduce the reaction force applied to the pedal immediately from the second reaction force to the first reaction force;

increase the reaction force applied to the pedal to the second reaction force if a predetermined preconditional control has been commenced and a starting condition to increase the reaction force applied to the pedal to the second reaction force is satisfied; and execute the gradual reduction control if the preconditional control has been cancelled and the depression of the pedal or the pedal force applied to the pedal is maintained to a constant value in a situation that the second reaction force is applied to the pedal, wherein the gradual reduction control includes a control to reduce the reaction force applied to the pedal from the second reaction force to the first reaction force in accordance with an elapsed time from a point at which the preconditional control has been cancelled.

12. A reaction force control system for a pedal, comprising:

a pedal that controls a driving condition of a vehicle; and a reaction force generator that generates a reaction force against a pedal force applied to the pedal, and that changes the reaction force, wherein the reaction force control system is configured to select the reaction force applied to the pedal from at least a first reaction force that is selected during normal propulsion of the vehicle, and a second reaction force that is greater than the first reaction force, the reaction force control system comprises a controller that controls the reaction force applied to the pedal, and the controller is configured to determine a satisfaction of a condition to reduce the reaction force applied to the pedal from the second reaction force to the first reaction force in a case that the second reaction force is selected, and execute a gradual reduction control to reduce the reaction force applied to the pedal gradually from the second reaction force to the first reaction force at a rate slower than a rate to reduce the reaction force applied to the pedal immediately from the second reaction force to the first reaction force;

detect the depression of the pedal or the pedal force applied to the pedal during execution of the gradual reduction control;

determine that the depression of the pedal or the pedal force applied to the pedal is not changed for a predetermined period of time; and reduce the reaction force applied to the pedal from the second reaction force to the first reaction force in accordance with an elapsed time from a point at which the depression of the pedal or the pedal force applied to the pedal has been maintained to a constant value, if the depression of the pedal or the pedal force applied to the pedal is not changed for the predetermined period of time.

\* \* \* \* \*